Feb. 25, 1964  B. H. KLYCE ETAL  3,122,075
PHOTOCOMPOSING MECHANISM
Filed March 18, 1953  7 Sheets-Sheet 1
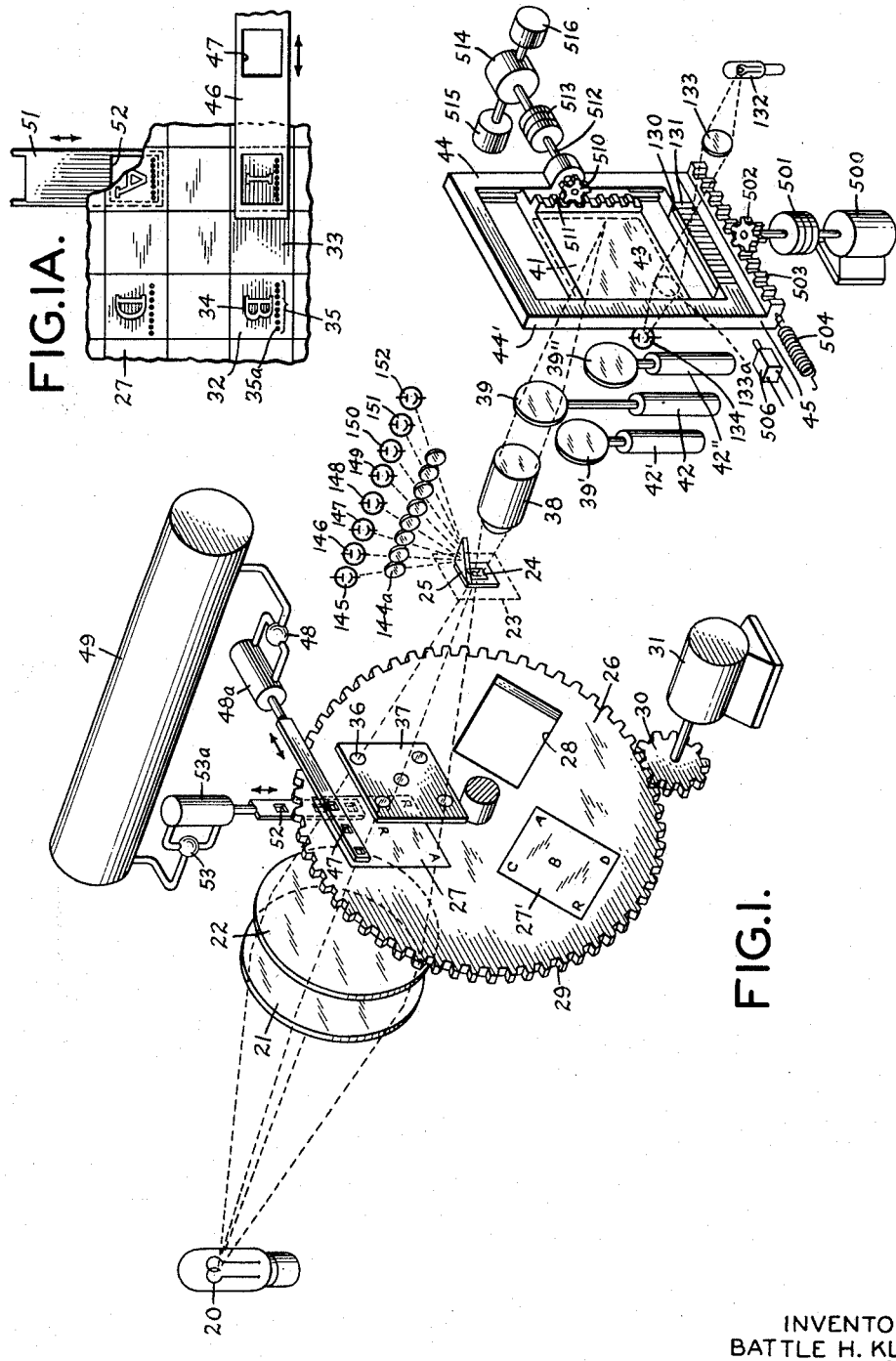
INVENTORS.
BATTLE H. KLYCE
F. KIMBALL LOOMIS
BY
THEIR ATTORNEYS.

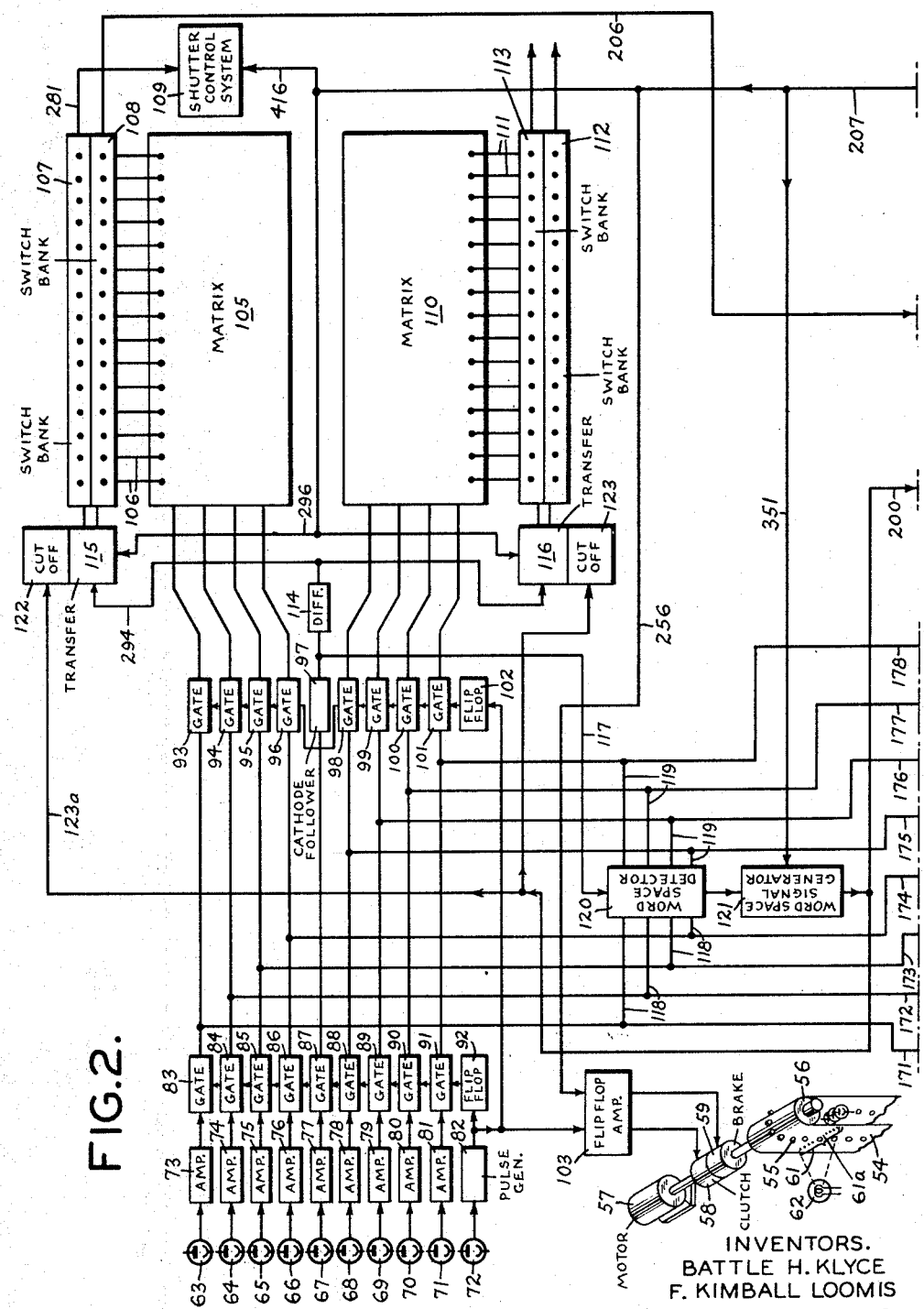

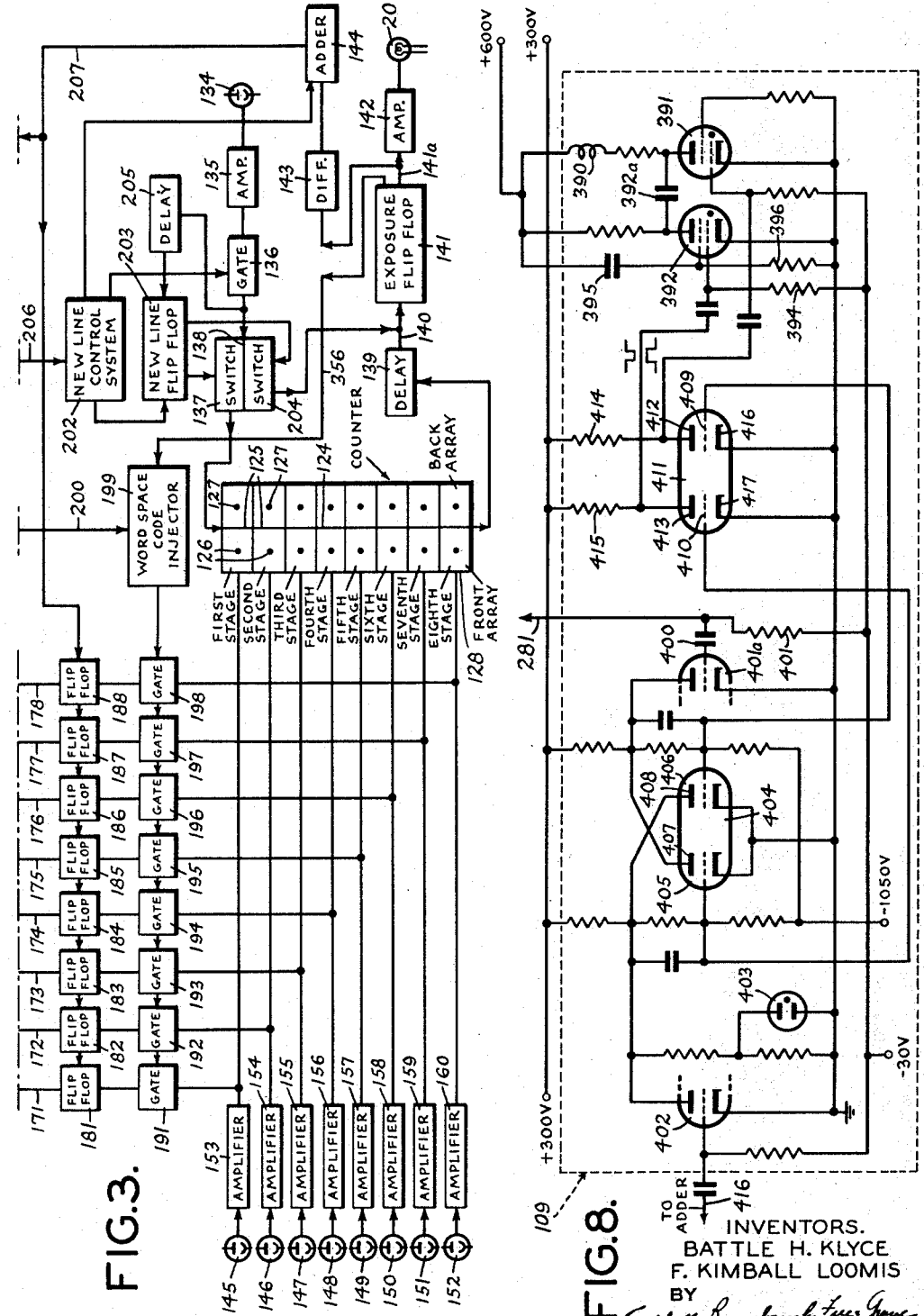

INVENTORS.
BATTLE H. KLYCE
F. KIMBALL LOOMIS
BY
THEIR ATTORNEYS.

Feb. 25, 1964    B. H. KLYCE ETAL    3,122,075
PHOTOCOMPOSING MECHANISM
Filed March 18, 1953    7 Sheets-Sheet 5

INVENTORS.
BATTLE H. KLYCE
F. KIMBALL LOOMIS
BY
Campbell, Brumbaugh, Free & Graves
THEIR ATTORNEYS.

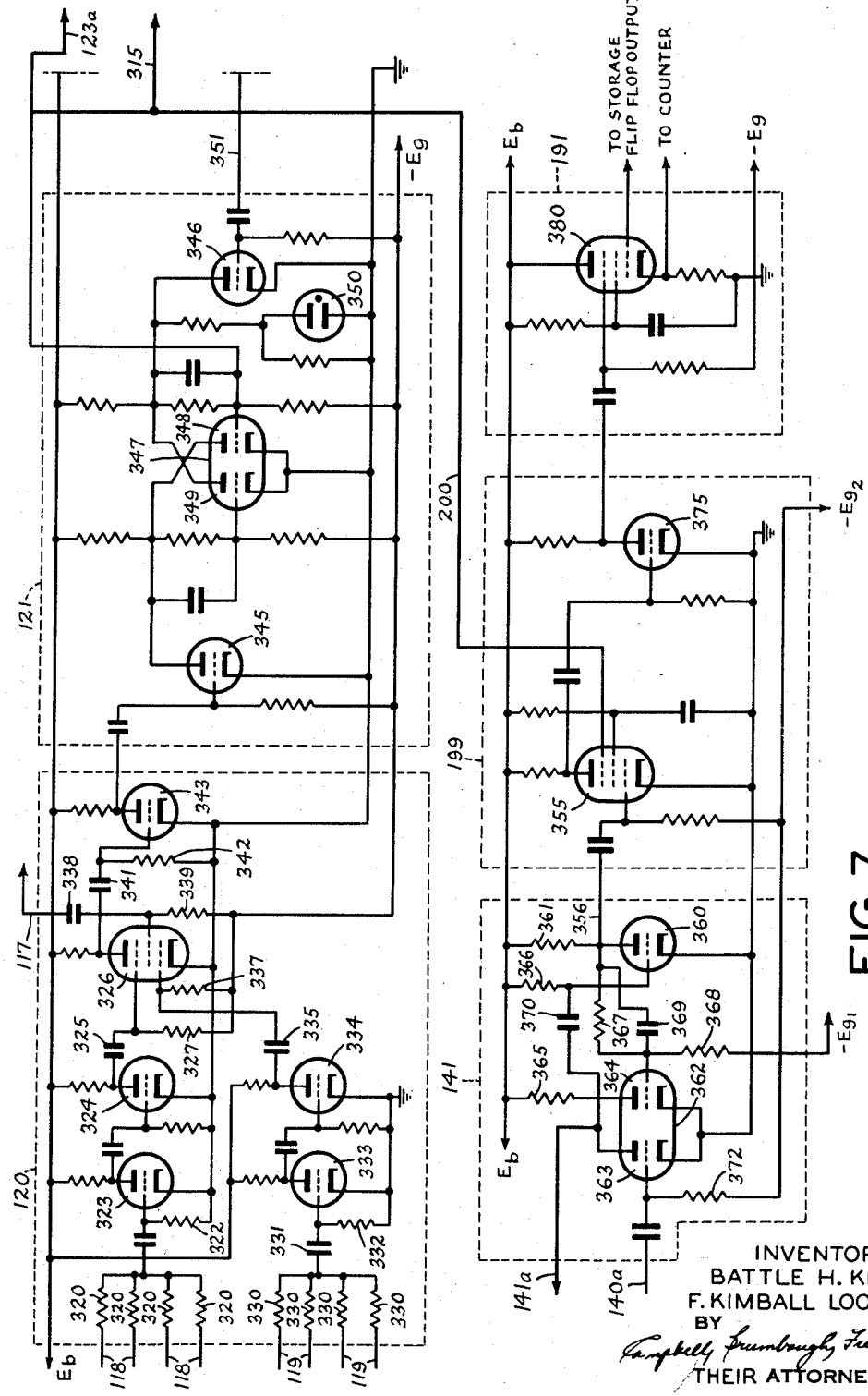

United States Patent Office 3,122,075
Patented Feb. 25, 1964

3,122,075
PHOTOCOMPOSING MECHANISM
Battle H. Klyce, Glenbrook, and Frederick Kimball Loomis, New Canaan, Conn., assignors to Time, Incorporated, New York, N.Y., a corporation of New York
Filed Mar. 18, 1953, Ser. No. 343,116
43 Claims. (Cl. 95—4.5)

The present invention relates to photocomposing apparatus. More particularly, it relates to apparatus for composing editorial copy in justified lines on a photosensitive emulsion or the like in a highly effective manner at high speeds of operation.

It has been proposed heretofore to print copy in justified lines on a photosensitive surface. However, the apparatus devised for this purpose has not been entirely satisfactory because it utilized moving mechanical parts which presented difficult acceleration problems at high speeds of operation. Also, the techniques employed in the apparatus imposed severe requirements for accuracy in timing the multiplicity of operations involved.

The principal object of the invention, accordingly, is to provide new and improved photocomposing apparatus which is free from the above-noted deficiencies of the prior art.

Another object of the invention is to provide new and improved photocomposing apparatus of the above character in which the number of factors which affect the accuracy of positioning the characters on the photosensitive medium are reduced to a minimum.

A further object of the invention is to provide new and improved photocomposing apparatus of the above character in which the number of circuits and mechanical elements which require accurate timing is substantially reduced.

For an understanding of the invention, reference is made to the following detailed description of a representative embodiment, taken in conjunction with the accompanying drawings, in which:

FIG. 1 is a schematic diagram of a typical photocomposing system constructed according to the invention;

FIG. 1A illustrates a typical character on a font grid and shows the code elements associated therewith to denote the width of the character;

FIG. 2 is a block diagram illustrating certain of the operating circuits for the system shown in FIG. 1;

FIG. 3 is a block diagram illustratiang certain other of the circuits shown for the system of FIG. 1;

FIG. 5 is a schematic diagram of the tape control system;

FIG. 6 is a schematic diagram of a typical system for selectively initiating either character selection operations or other operations in response to a signal from a decoding device;

FIG. 7 illustrates schematically certain of the word space circuits and other circuits associated therewith;

FIG. 8 illustrates schematically a typical shutter control mechanism for use in the photocomposing system of the invention;

The Principal Optical System

Figure 9:
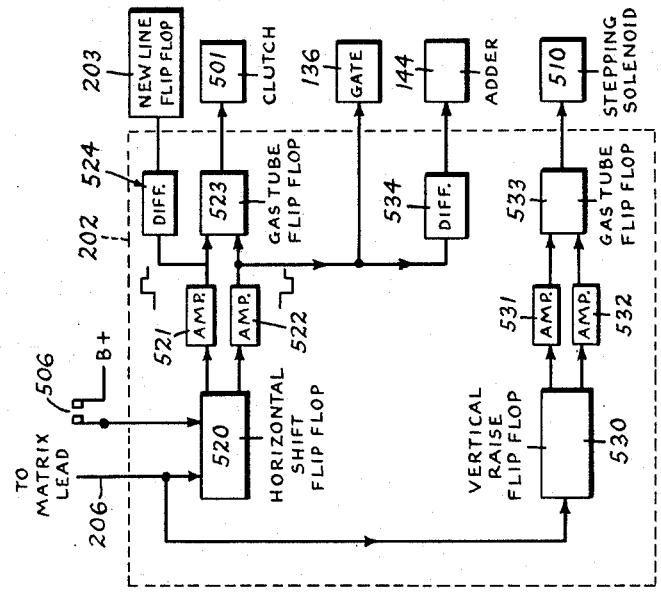
FIG. 9 illustrates in block diagram the control system for obtaining a new line.

In the illustrated form of the invention disclosed in FIG. 1 the apparatus comprises a light source 20 which may be a Sylvania type R4330 Krypton-Xenon discharge tube, for example, and a pair of primary condensing lenses 21 and 22 which are arranged so as to project a 1:1 inverted image of the filament of the lamp 20 upon an imaginary plane 23 which is defined by the face of an aperture 24 and the front face of a prism 25 disposed directly above the aperture. The lenses 21 and 22 are preferably paraboloids and they establish a cone of light, each element or ray of which comes to focus upon the plane 23.

In front of the condensing lens 22 is disposed a circular font plate 26 which carries on its face as attachable units a plurality of font grids of which two font grids 27 and 27′ are shown. The font grids may be attached over square apertures 28 in the font plate 26 by conventional fastening means (not shown). The font plate 26 may be rotated to bring a selected one of the font grids attached thereto, in the present instance font grid 27, into operative relation with the optical system by means of a peripheral row of gear teeth 29 on font plate 26 which are engaged by a pinion 30 which is in turn rotatable by a motor 31.

Each font grid, as shown in more detail in FIG. 1A, may be considered to be made up of a set of 30 rows and 30 columns, the fifteen odd rows intersecting the fifteen odd columns to form 225 square print spaces 32 while the even rows and columns intersect to form masking spaces 33. Each print space 32 consists of an opaque background having in one portion a transparent character 34 and in another portion a row 35 of 8 code elements 35a, each element being either an opaque or a transparent dot. Each row 35 of code elements in a given print space forms, in a manner later described, a character width code for its associated character. The characters 34, which in a given font grid, all belong to the same type font may include the usual characters in the alphabet in addition to the usual numerals, punctuation marks, etc.

Referring again to FIG. 1, disposed in front of font plate 26 opposite condensing lens 22 are a plurality of projection lenses 36 mounted on a suitable carrier 37. The optical axis of each projection lens 36 lies along a ray of the cone formed by primary condensing lenses 21 and 22. When front grid 27 or another front grid is placed between condensing lens 22 and projection lenses 36, each lens 36 receives those rays which pass through the transparent portions of a single corresponding print space 32 of the font grid 27. As a result, upon passage of light through a single given print space 32 the conical beam for the character 34 and character width row 35 associated therewith is projected by the corresponding projection lens 36 onto the plane 23.

While the illustrated embodiment discussed in fact employs font grids of 225 print spaces with an equal number of projection lenses associated therewith, for simplicity, in FIG. 1 only a few of the print spaces 32 and projection lenses 36 are shown.

With respect to the inverted image of the transparent portions of a single print space 32 projected upon plane 23, the upper half corresponding to the character width row 35 falls upon the front face of prism 25 while the lower half corresponding with character 34 falls upon the face of the aperture 24. Hence, at the plane 23 the light beam passing through a given print space is split with that part of the beam representing the character width row 35 being reflected by prism 25 to be utilized in a manner later described, and that part of the light beam representing the character 34 passing through the aperture 24.

Immediately in front of the aperture 24 is disposed a collimating lens 38 which serves to convert the rays in the diverging cone of light from the aperture 24 to parallel rays. The light from the collimating lens 38 is focused by means of an objective lens 39 upon a photosensitive medium 41 (shown in FIG. 1 in dotted outline). In order to provide for different point sizes of type a plurality of auxiliary objective lenses 39', 39'' may be provided to alter the magnification of the character images formed on the photosensitive medium 41. Any one of the objective lenses 39, 39', 39'' may be moved in or out of the light path from the source by suitable means such as the solenoids 42, 42', 42'' which may be actuated by a control system of a type later described.

The photosensitive medium 41 may be mounted on a platen 43 which is in turn mounted for vertical movement between two upright members 44 and 44' of a horizontally movable carriage 45. By the mounting just described the carriage 45 and platen 43 may be given (by a mechanism later described) a substantially continuous horizontal motion from right to left as viewed from lamp 20, corresponding to the printing of a single line from left to right upon the medium 41. Upon approaching the left-hand end of travel the carriage 45 is adapted to fly back to its original right-hand position carrying with it the platen 43. At the same time, by another mechanism later described, the platen 43 may be vertically raised a step corresponding to a new line of printing upon the medium 41.

For any front grid, for example font grid 27, as stated there are fifteen rows in which print spaces 32 alternate with mask spaces 33, and also fifteen columns in which the same print spaces 32 alternate with other mask spaces 33. Considering first the elements associated with the fifteen rows, disposed proximate the front face of font plate 26 are a set of 15 horizontal shutters 46 placed one above the other. The horizontal shutters are so positioned that when any front grid is positioned in operative relation with the optical system of FIG. 1 each horizontal shutter 46 is coextensive with and registers with one of the mentioned fifteen rows. Further, each shutter 46 has a plurality of apertures 47 matched in number, size and spacing to the print spaces 32 in its corresponding row to uncover all of these print spaces when shutter 46 is urged to extended position. Normally each shutter 46 is maintained in retracted position, its apertures 47 registering with mask spaces 33 and the body of the shutter covering the print spaces 32 of the corresponding row. Extension and retraction of a shutter 46 may be accomplished by a solenoid operated valve 48 associated with the shutter which is actuated in a manner later described to control the flow of compressed air from a tank 49 to a shutter driving piston 48a movable by the air in two directions.

In similar fashion disposed proximate the back face of font plate 26 and aligned with each of the 15 print space columns are 15 shutters 51 of which, for simplicity, only one shutter 51 is shown in FIG. 1. Each shutter 51 has apertures 52 which will uncover and cover all the print spaces of the corresponding column when such shutter is in extended and retracted positions respectively. The positions of shutters 51 may be controlled, as in the case of shutters 46, through the agency of solenoid operated valves 53 actuated in a manner later described, to control two-way acting shutter driving pneumatic pistons 53a.

With the construction described above it will be understood that the movement of any two perpendicular shutters, when selected by a means later described, will uncover a single print space 32 which is common to a particular row and a particular column, and that in the illustrated embodiment of FIG. 1 the 15 horizontal shutters 46 and the 15 vertical shutters 51 form 225 distinct shutter pairs which can coact by uncovering a print space 32 to select any one of the 225 separate characters 34 displayed on the utilized font grid 27. After a particular character 34 has been selected, lamp 20 for a short period is flashed on by means later described to throw an image of the character upon photosensitive medium 41 which upon exposure thereto develops a photographic replica of the same. Successive character selections and horizontal movement of medium 41 produces a line of printing on the latter.

*The Electrical System (Front End)*

The photocomposing apparatus described briefly above is adapted to be controlled in response to intelligence contained in a storage medium such as a conventional perforated or magnetic tape, for example. For purposes of illustration the storage medium, shown in FIG. 2, is a perforated tape 54 which is provided with sprocket holes 55 enabling the tape 54 to be advanced by sprocket means 56 driven by a motor 57 through a conventional clutch and brake mechanism such as a fluid magnetic clutch 58 and brake 59 for example. Information items are stored on the tape by transverse rows 61 of 9 tape elements 61a aligned with each sprocket hole 55 which tape elements 61a may be either unperforated spaces or perforated holes. The 9 tape elements represent two similar series of 8 code element binary code groups and an additional indicator element which distinguishes the code groups of the second series from the code groups of the first. Consequently a row 61 may be referred to as a code group row, the 9 tape elements of which may be referred to as the 8 code elements and indicator element respectively.

The code groups of the first series which may be called character code groups are used to initiate operations for selecting particular characters 34 on a font grid 27 by the uncovering action of a pair of shutters 46 and 51. The code groups of the second series, which may be called type set code groups, are divided as later described into two types, in which the first type code group, which may be called a format code group, initiates operations to change the format of the printed material upon photosensitive medium 41 such as, for example, shifting to a new line or new column, or changing the point size of the type or the font of type utilized, and in which the second type code group, which may be called a word space code group, initiates operations for producing word spaces between adjacent words printed upon the medium 41.

The tape 54 is adapted in a scanning situation to pass light from a source 62 through a sprocket hole 55 and the perforated elements of an accompanying row 61 to a group of phototubes 63, 64, 65, 66, 67, 68, 69, 70, 71 and 72 of which photocell 72 is adapted to scan sprocket holes 55, photocell 67 is adapted to scan the indicator element and the other 8 phototubes are adapted to scan the other 8 code elements. By means later described clutch 58 and brake 59 impart to tape 54 a rapid but intermittent step-by-step movement so that successive rows 61 are moved between light source 62 and photocells 63—72 for scanning, remain in this scanning position for a short time period, and then are moved out of scanning position to give way to a new code group.

Each of the photocells 63—72 responds to the passage of light through sprocket hole 55 or a corresponding tape element 61a on the tape 54 by a decrease in the plate voltage of the photocell (FIG. 10, wave form A), the photocells 63—71 thereby converting into electric signal form the items of information originally represented by the indicator element and 8 code elements of rows 61 on the tape 54. As a particular row 61 is pulled into scanning position, starting with its front edge an increasing area of a sprocket hole 55 or tape element 61a registers with the light path from source 62 causing a short interval of falling voltage for the corresponding photocell (portion *a* of wave form A). Similarly as the code group is pulled out of scanning position, decreasing areas of a code element register with the light path, causing a short interval of rising voltage for the corresponding photocell (portion *b* of wave form A). In the interim while the code group remains stationary in scanning position the photocell plate voltage remains constant at a decreased value (portion *c* of wave form A). The dotted portions of the wave forms in FIG. 10 represent a lapse of time greater than is directly shown.

The output signals of photocells 63–71, inclusive, are fed to amplifier sections 73–81, inclusive, respectively, which amplifier sections may include one or more conventional amplifier stages coupled by conventional resistor condenser couplings. While the signals developed by the photocells during scanning may be on the order of milliseconds in duration, only the initial and end portions of the signals are utilized further in the system. Accordingly, as will later be more evident, the signals may be permitted to deteriorate as a result of the resistor condenser couplings in the amplifier sections 73–81 (FIG. 10 wave form B). Of course, however, broad band amplifiers which do not cause this signal deterioration are preferable.

Figure 10:
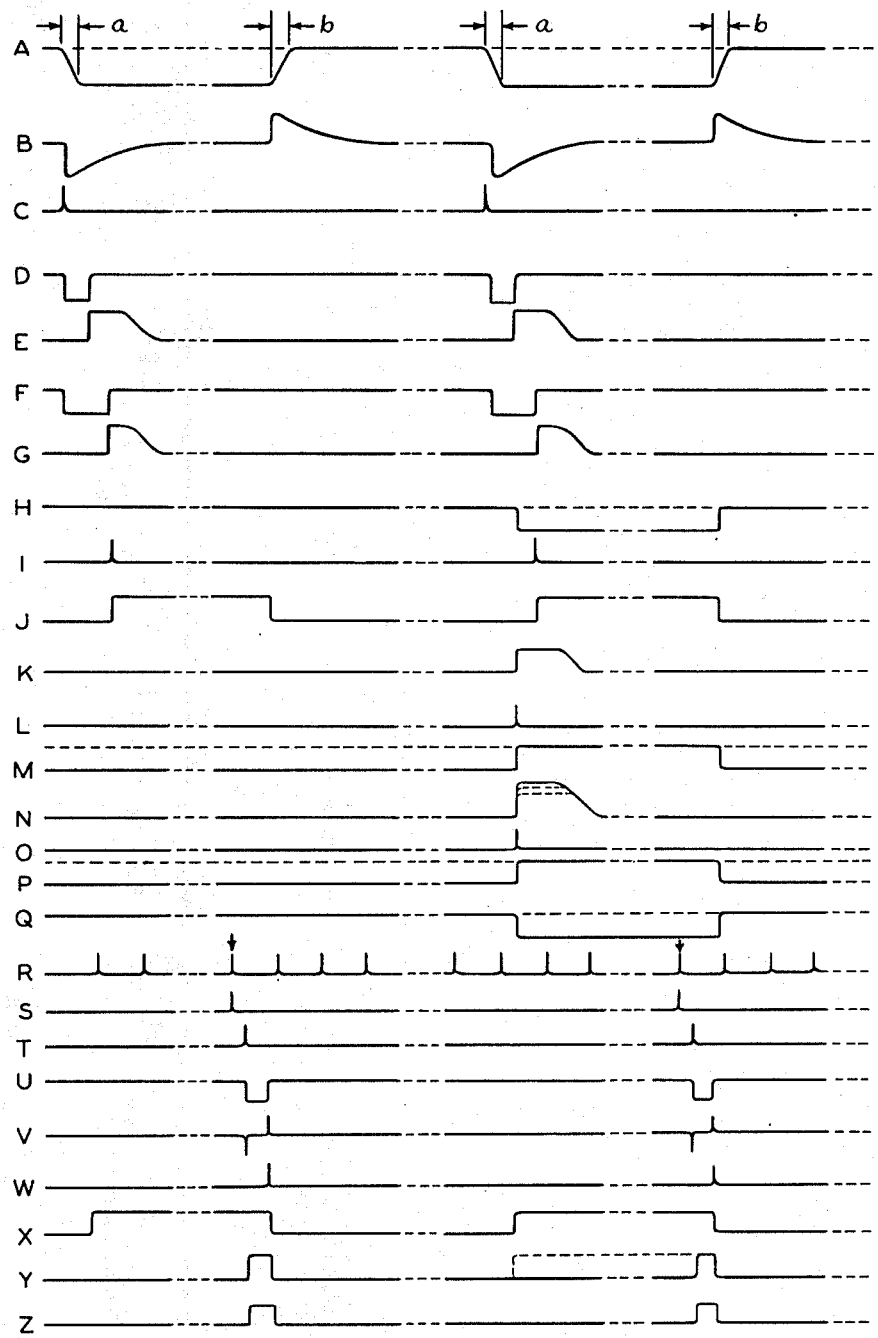
FIG. 10 illustrates certain of the electrical signal wave forms pertinent to the operation of the illustrated embodiment of the invention.

The output of photocell 72 which scans the sprocket holes 55 is fed to a pulse generating circuit 82, to be later described, which circuit produces as an output positive pulses coincident with the short interval when a code group is partially but not fully advanced into scanning position (FIG. 10 wave form C). These positive pulses are used to trigger a first monostable gating flip-flop circuit 92 of a conventional type to be later described, the flip-flop circuit producing as an output short interval negative square waves (FIG. 10, wave form D) which in turn are used to render non-conductive first gate circuits 83–91 which may be conventional gated amplifiers and which ordinarily are operative to conduct signals from the outputs of amplifier sections 73–81, to further points in the system. By blocking signal passage through the gate circuits 83–91 in the manner described the signals at the outputs of gate circuits 83–91 are somewhat delayed (FIG. 10, wave form E), and the possibility is thereby avoided of low amplitude signals prematurely initiating operations further in the system. Undesirable low amplitude signals of this sort might arise in which, due to slow tape movement, a code group for an overextended period is partially but not fully advanced into scanning position.

The pulses at the output of pulse generator 82 (FIG. 10, wave form C) are also used to trigger a second monostable gating flip-flop circuit 102 of a conventional type to be later described. Flip-flop icircuit 102 has a negative square wave output (FIG. 10, wave form F) of slightly longer duration than the output of flip-flop 92. The square wave so produced by flip-flop 102 is utilized to render non-conductive second gate circuits 93—96 and 98—101 which may be conventional gated cathode followers and which ordinarily pass signals from the output of first gate circuits 83—86 and 88—91 respectively to points further in the system. By the described operation of gate circuits 93—96 and 98—101 the signals derived from photocells 63—66 and 68—71 are further delayed (FIG. 10, wave form G) until certain switching operations at times necessary to the functioning of the system (generally represented by FIG. 10, wave form H) and to be later described, have been fully completed. The signal developed by photocell 67 which scans the indicator element is not subjected to this second delay effect, the output of first gate circuit 87 being fed to the input of ungated cathode follower 97.

The output from pulse generator 82 is additionally used to affect the action of a tape movement flip-flop circuit 103 to be later described.

*Character Selection and Format Circuits*

The signals from second gate circuits 93—96 inclusive, are fed as four separate inputs to a suitable decoding device which may be a conventional matrix circuit 105. The matrix 105 is so designed that for each of 15 binary code combinations of signals generated by the photocells 63—67, it will deliver a signal to one and only one of 15 leads 106. Matrix 105 has no output lead corresponding to the condition where each of its 4 inputs is absent a signal. A matrix suitable for this purpose is described in greater detail in an article entitled "Rectifier Networks for Multiposition Switching," by D. R. Brown and N. Rochester, in the "Proceedings of the I.R.E." of February 1949, volume 37, No. 2.

Each of the leads 106 is connected to a separate pair of tubes or tube sections (not shown in FIG. 2), in which arrangement, for each tube pair, one tube is located in a switch bank 107 and the other tube in the switch bank 108. For character selection by means later described the tubes of switch banks 107 and 108 are maintained conductive (FIG. 10, wave form H) and non-conductive (FIG. 10, wave form M) respectively of signals on leads 106. Each signal appearing on a lead 106 and routed through a tube in switch bank 107 is differentiated by a differentiating circuit (not shown in FIG. 1) to produce a positive pulse coincident with the front edge of the signal (FIG. 10, wave form I). The positive pulse so produced triggers a control system 109 having a square wave output (FIG. 10, wave form J) which control system operates a selected shutter 46 to uncover a row of characters 34. For simplicity only one shutter actuator control system 109 is shown in FIG. 2.

In similar fashion, the signals from second gating circuits 98—101 are fed as inputs to another matrix 110 which may be the same as the matrix 105. The matrix 110 like matrix 105 is adapted to provide a signal at one and only one of fifteen leads 111 for each of 15 binary code combinations of signals developed by photocells 68—71. Each of the leads 111 is connected to a separate pair of tubes or tube sections (not shown in FIG. 2), in which arrangement, for each tube pair, one tube is located in a switching bank 112 and the other tube in a switching bank 113. For character selection means later described the tubes of switch banks 112 and 113 are maintained conductive and non-conductive respectively of signals on leads 111. Each signal appearing on a lead 111 and routed through a tube of switch bank 112 actuates in the manner described for signals from matrix 105 a control system (not shown) which operates a selected shutter 51 to uncover a column of characters 34.

In ordinary operation, therefore, which is to say when a character selection operation is indicated, separate signal combination inputs to both of matrices 105 and 110 cause operations of a particular pair of shutters 46 and 51 to uncover a single character 34 of the 225 available characters on font grid 27.

According to binary code theory where a code group has 8 code elements a possible $2^8$ or 256 binary code combinations may be obtained. In the device disclosed, however, the binary code elements are represented by the presence or absence of electrical signals on 4 inputs for each of 2 matrices. In such case, obviously, the system cannot utilize the binary code combination which is represented by the absence of all 8 signals, for such a signal combination would occur when the photocells 63—66 and 68—71 scan no code group at all. Further, with respect to the series of code groups representative of characters, the system cannot utilize those binary code groups where there is an absence of signals on all 4 inputs to one or the other of matrices 105 and 110, for the system is designed to uncover a character 34 only upon the movement of both a shutter 46 and a shutter 51. This fact eliminates the use of another 30 code groups. Hence, as to the series of code groups representing characters there are 256—(1+30) or 225 code groups available to represent characters.

As mentioned, the element of a code group row 61 scanned by photocell 67 is an indicator element which distinguishes between the character selection series of code groups and the type set series of code groups. If the indicator element is an unperforated space so that photocell 67 develops no signal, the fact indicates the presence of a character code group whereas if the indicator element is a perforated hole so that photocell 67 develops a signal the fact indicates the presence of a typeset code group. In this second series of 8 element typeset code groups, that binary code combination is not used which would be represented by the absence of a signal on all 4 inputs for each of the matrices 105 and 110. There are thus left available for use 255 binary code combinations. Of these number of combinations a total of 30 are of the type where no signals appear on any of the inputs of one matrix and at least one signal appears on the input of the other. These first type or format signal combinations are used to effect format operations. The remaining 225 signal combinations are of a type where at least one signal appears on both an input lead to matrix 105 and an input lead to matrix 110. Signal combinations of the second or word space type are utilized to produce word spaces between adjacent words impressed on photosensitive medium 41.

Considering now generally the electric circuit arrangement utilized with the type-set series of code groups if a type-set code group row 61 is presented for scanning the signal originally developed by photocell 67 and appearing at the output of cathode follower 97 (FIG. 10, wave form K) is differentiated by the conventional differentiating circuit 114 to produce a positive pulse (FIG. 10, wave form L) which coincides with the front edge of the output signal from cathode follower 97. It will be noted that the positive pulse so produced leads by a slight interval the code signals at the outputs of gate circuit 93—96 and 98—101 (FIG. 10, wave form G).

The positive pulse from differentiating circuit 114 is applied as a trigger to transfer circuits 115 and 116 which are bistable gas tube flip-flop circuits of a conventional type later described. Transfer circuit 115 controls in an opposite sense the conductivity of the tubes of switch banks 107 and 108, the transfer circuit 115 having an asymmetrical feature by which upon its initial energization or re-energization the tubes of switch bank 107 are rendered conducting and those of switch bank 108 non-conducting.

Similarly, transfer circuit 116 controls in an opposite sense the conductivity of the tubes of switch banks 112 and 113 and also has an asymmetric feature by which upon its initial energization or re-energization, the tubes of switch bank 112 conduct and those of switch bank 113 do not conduct.

Upon reception of the positive trigger pulse both transfer circuits 115 and 116 reverse states to in turn reverse conductivity between the tubes of switch banks 107 and 108 (FIG. 10, wave forms H and M) and between the tubes of switch banks 112 and 113. Since as noted, the trigger pulse initiating the reversal action leads the code signals from second gating circuits 93—96 and 98—101, the reversal of conductivity of the switch banks will be fully completed before a signal appears on any of the output leads 106 and 111 of matrices 105 and 110, respectively.

For reasons later explained this reversal of conductivity between the members for each of the two pairs of switch banks can only take place when all 4 inputs of one or the other of matrices 105 and 110 are devoid of signals. A situation of this sort occurs where the scanned code group of row 61 is of the format type calling for a format operation.

Assuming a format code group to be present a signal will appear on one of the leads 106 of matrix 105 or on one of the output leads 111 of matrix 110. If appearing on an output lead 106, the signal is routed via switch bank 108 to actuate, in the manner previously described for character selection, a control system (not shown in FIG. 2) which initiates a selected formal operation. Similarly, if appearing on output lead 111 the signal is routed via switch bank 113 to actuate a control system (not shown in FIG. 2) which initiates another selected format operation.

In the case where the photocell 67 develops a signal but the code group present is of the word space type, requiring that at least one signal appear on any one of the input leads of matrix 105 and at least one signal appear on any one of the input leads of matrix 110 the reversing actions of transfer circuits 115 and 116 are completely nullified, and all of switch banks 107, 108, 112, and 113 are rendered non-conducting to pass signals therethrough. This disabling effect upon the transfer circuits and upon all of the switch banks is accomplished by the means described below.

*Word Space Circuits*

As mentioned heretofore, a word space code group as represented by a row 61 of tape elements 61a on the tape 54, designates the width of a word space between adjacent words on a composed line of photosensitive medium 41. In order to provide for proper justification, under different conditions word spaces having different values must be used. In practice, in the course of impressing the various code groups on tape 54 the proper word space to be employed is preferably determined in a suitable typewriter mechanism, for example, in which the accumulated character space is indicated on a dial and the remaining space in the line is mechanically divided into a number of approximately equal parts. This number is equal to the number of word spaces in the line, and the widths of the mechanical divisions are converted into code groups which are impressed at the appropriate places in rows 61 upon tape element 54.

Considering now the word space circuits involved, the output of cathode follower 97 is connected by a lead 117 to a first input of a word space detector circuit 120 which may be a conventional triple coincidence circuit. Word detector circuit 120 has a second input which is connected to receive signals by leads 118 from any of the outputs of first gating circuits 83—86 and a third input which is connected to receive signals by leads 119 from any of the outputs of first gating circuits 88—91. Assuming the presence of a word space code group signal combination, a first signal will appear at the output of cathode follower 97 (FIG. 10, wave form K), a second signal will appear on at least one of the outputs of first gating circuits 83—86 (FIG. 10, wave form E) and a third signal will appear on at least one of the outputs of first gating circuits 88—91 (FIG. 10, wave form E). These three signals will all be received by the wave space detector circuit 120 to establish a condition of triple coincidence (as shown by FIG. 10, wave form N in which the solid line represents the output of cathode follower 97 and the two dotted lines represent the outputs of the two mentioned sets of first gating circuits).

The triple coincidence condition being established in word space detector circuit 120, the circuit produces a positive pulse which positive pulse (FIG. 10, wave form O) coincides with the front edge of the recieved signals. This positive pulse so produced triggers a word space signal generator circuit 121 which may be a bistable flip-flop circuit of a conventional type later described. The output of word space signal generator circuit 121 is a positive square wave (FIG. 10, wave form P) which is applied to the separate cut-off circuits 122 and 123 by lead 123a. Upon reception of this square wave, cut-off circuits 122 and 123 operate to remove the plate voltage from transfer circuits 115 and 116 respectively (FIG. 10, wave form Q), thereby disabling the same. The disablement of transfer circuits 115 and 116 in turn renders non-conducting all of switch banks 107, 108, 112 and 113. Comparison of FIG. 10, wave forms Q and G indicates that the mentioned switch banks are disabled prior to the reception of a code signal by the matrices 105 or 110. Consequently, a matrix output signal appearing on any of the leads 106 or 111 is completely ineffective to initiate a character selection or format operation.

It will be obvious that, although in the case of character selection code group signal combinations and format code group signal combinations certain signals will be received by word space detector circuit 120, since in these cases no triple coincidence condition is established, word space detector circuit 120 will not be operative to produce as an ultimate consequence the disability of all of the switch banks.

*Circuits for Producing Spacing on a Printed Line*

Referring now to FIG. 3, the figure discloses the electrical arrangement by which word spaces and other line displacements on photosensitive medium 41 can be effected. In FIG. 3, the numeral 124 designates a selective predetermined binary counter such as is disclosed in the article entitled "Predetermined Counters," by John J. Wilde, on pages 120–123 of the March 1947 issue "Electronics," vol. 20, No. 3. While the selective predetermined counter is in itself no part of the present invention, its characteristics will be briefly discussed.

A binary counter is an electric circuit which continuously counts the number of received pulses in a train of pulses fed as an input to the circuit. The circuit in itself comprises a chain of multi-vibrator stages 125 each having a front tube 126, and a back tube 127, and the stages being so coupled that the first stage reverses its conducting condition for every input pulse received, the second stage reverses once for every two reversals of the first stage, the third stage reverses once for every two reversals of the second stage and so on. As a result of the use of the coupling arrangement just described, for each accumulated number of received input pulses some of the front tubes may be conducting and others non-conducting, and for each new pulse received, one or more of the front tubes will change its condition. The array 128 of front tubes 126 therefore represents at any instant in binary code form the accumulated number of pulses received by the counter.

Upon reaching a certain total count, the binary counter clears and resets itself so that the front tube array 128 displays a binary code equivalent to 0, as for example, where all the front tubes are non-conducting. This resetting action may occur at a natural registered count of $2^n$ where $n$ equals the number of multi-vibrator stages, as, for example, 256 in an 8 stage counter, or it may occur at any prefixed registered count less than the natural count, such as 250 in an eight stage counter, by the use of a coincidence circuit (not shown) which responds at and only at the count of 250 to feed back a clearance pulse to all the multivibrator stages, all of the stages thereby being reset. This registered count at which clearance and resetting takes place will be referred to as the reset total.

In a selective predetermined counter, additionally, immediately after clearance a binary code representative of a given number of counts may be injected in the form of electric signals on the grids of selected tubes 126 in the front tube array 128. The effect of this injected binary code is to reduce by the given number of counts the number of pulses in one counting run (which number will be referred to as the preset count) which the counter must receive before it again clears and resets itself. For example, if the reset total of an 8 stage binary counter is 250 and the binary code injected into the counter immediately after clearance is representative of the number 128, the number of pulses which the counter must receive before it again clears and rests itself is 250—128 or 122 pulses. The binary code injected may thus be called a complement code since it represents the number which is the complement of the preset count, and the injection may be said to effect presetting of the counter.

In FIG. 3 the input pulses to the selective predetermined binary counter 124 may be furnished by an arrangement, the optical portion of which is shown in FIG. 1. Referring again to FIG. 1, mounted on carriage 45 below the photosensitive medium 41 is a transparent horizontal member 130 upon the face of which are formed a plurality of equally spaced, opaque, vertically extending indicia 131. The indicia 131 form a grating or grid which is aligned with photosensitive medium 41, and which, by the imaginary extension of vertical indicia lines 131 upwards, divides a composed line on the photosensitive medium 41 into a relatively large number of parts. In a typical machine constructed according to the invention, approximately 500 lines per inch may be employed. These lines divide the composed lines into intervals which are almost too small for the human eye to see.

The indicia 131 on the member 130 are illuminated by a source of light 132 through a lens system 133, and light passing through the member 130 is directed through a lens system 133a to a photocell 134. As carriage 45 and member 130 move in the direction for composing a line on photosensitive medium 41, the various indicia 131 successively interrupt the passage of light from source 132 to photocell 134, causing a train of pulses to be generated by the same (FIG. 10, wave form R).

Referring again to FIG. 3, the pulse output of the photocell 134 may be amplified by a conventional amplifier means 135 and fed through a gate circuit 136 normally operative to pass signals, but which blocks signal passage during fly back movement of carriage 45. From gate circuit 136 the pulses normally pass through section 137 of the switching pair 138, and from thence are fed into the input of selective predetermined counter 124. Upon receiving the input pulse which raises the registered count to the reset total (arrow marked pulses of FIG. 10, wave form R), the selective predetermined counter 124 in the course of clearing and resetting itself produces an output pulse (FIG. 10, wave form S). This output pulse is fed via a conventional short delay circuit 139 by a lead 140 to the input of an exposure flip-flop circuit 141, the delay time produced by the delay circuit 139 being at least greater than the time required for complete resetting counter 124. The delayed output pulse (FIG. 10, wave form T) upon reaching the input of the exposure flip-flop circuit 141, which is of a conventional mono-stable type later described, triggers the exposure flip-flop 141 to create at its output a negative square wave signal (FIG. 10, wave form U) and also a positive square wave signal (FIG. 10, wave form U inverted). The negative square wave signal by one lead is fed via conventional amplifier 142 to the lamp 20, flashing the light on for the period of the square wave. The light beams from lamp 20 during its illuminated period pass through a print space 32 previously selected by a pair of shutters 46 and 51 to cause a replica of the character 34 of the print space to be impressed upon photosensitive medium 41 by the light exposure.

By another lead the negative square wave output from exposure flip-flop 141 is fed to a conventional differentiating circuit 143 which forms short negative and positive pulses corresponding to the front and back edges of the square wave, respectively (FIG. 10, wave form V). The pair of pulses so formed is fed to a conventional adder circuit 144 which eliminates the negative pulse, and produces coincident with the positive input pulse a positive output pulses (FIG. 10, wave form W). The adder circuit later described, by means of its positive output pulse causes a new code group on thee tape 54 to be drawn into scanning position in a manner also later described.

The duration of the output square wave of flip-flop 141 is designed to be sufficiently long to cause proper exposure of a character 34 upon the photosensitive medium 41, but sufficiently short so that (as is seen by comparing waveforms R and V of FIG. 10) the square wave terminates before selective predetermined counter 124 receives the pulse following the resetting pulse from indicia scanning photocell 134.

When the code groups on tape 54 call for the printing of a number of successive characters to form a word, for example, each character occupies on a printed line a character width space, with different characters, such as, for example, M and I requiring different character width spaces. Now the separate optical systems which are arranged to scan the indicia 131 on member 130 and to project characters 34 upon the photosensitive medium 41 are so related geometrically that when a particular character is projected upon photosensitive medium 41 by the flashing of lamp 20, the left hand edge of the width space required by the character 34 is in vertical alignment with that particular indicium 131 which initiates the pulse effective to reset selective predetermined counter 124. The indicium referred to by means described below also coincides in vertical alignment with the right hand edge of the width space of a character previously impressed upon the line being composed on photosensitive medium 41. Hence each character as printed is properly spaced in width with respect to the previously printed character.

It will be recalled that (FIGURE 1A), the row 35 of dots 35a represent a character width space code for the character 34 appearing in the same print space 32. The relationship between the width space of a particular character, say R and the code of the row 35 of dots 35a associated with R may be set forth more exactly as follows. Assume that the width space required for the character R is 122 units where each unit represents the interval between two indicia 131 on the member 130. Assume also that the reset total for binary counter 124 is 250. The row 35 of dots 35a associated with character R will then represent in binary code form the number 250—122 or 128. In other words, any row 35 forms the complement code for the number of intervals between indicia 131 needed to represent on a composed line the width space of the character 34 associated with the row 35.

Referring again to FIG. 1, it will also be recalled that the beam of light passed by a particular print space 32 is split upon reaching the plane 23, the lower half of the light beam carrying the character image passing through the aperture 24 and the upper half of the light beam carrying the image of the row 35 of dots 35a being reflected by the prism 25. Considering now the upper half of the light beam, subsequent to reflection by the prism 25, the beam diverges horizontally so the portions of the beam corresponding to the separate dots 35a in a row 35 follow separate paths, these separate light beam portions being passed through condensing lenses 144a to be focused upon an array of character width space detector photocells 145—152.

The electric signals generated by the photocells 145—152 upon reception of the light pulses corresponding to transparent dots 35a are fed (FIG. 3) through a set of amplifiers 153—160 to the tubes 126 on front tube array 128 of counter 124, the complement code for the width of the character being exposed on medium 41 thereby being injected into the counter. Since the mentioned injection occurs at the start of a new counting run, medium 41 will move to the right hand edge of the width space, measured in indicia intervals, of the character just printed, before the number of counter input pulses derived from the indicia 131 scanned during the run causes counter 124 to reach again its reset total and to produce an output pulse permitting a new character to be exposed. Accordingly, successive characters printed on a line of medium 41 will be properly spaced apart.

The circuits for producing word spaces between adjacent words are also shown in FIG. 3. Referring to FIGS. 2 and 3, momentarily, the outputs of first gate circuits 83—86 are connected by leads 171—174 to storage flip-flops 181—184, respectively, and the outputs of first gate circuits 88—91 are connected by leads 175—178 to storage flip-flops 185—188, respectively. The storage flip-flops 181—188 are bistable circuits of a conventional type to be later described. Prior to the appearance of signals on the outputs of first gates 83—86 and 88—91, the storage flip-flops 181—188 are maintained in a condition of susceptibility to triggering by these output signals.

When in fact a signal combination does appear upon the outputs of the mentioned gate circuits, those storage flip-flops connected to signal producing gate circuits will be triggered to reverse states and those storage flip-flops connected to gate circuits having no signal outputs will stay untriggered, remaining in their original condition. It will be seen, therefore, that the array of storage flip-flops 181—188 duplicate the binary code signal combination developed by photocells 63—66 and 68—71, and that further because of their bistable feature the storage flip-flops will preserve the binary code even after the original signals have deteriorated by passage through amplifiers sections 73—76 and 78—81.

The output leads from storage flip-flops 181—188 are connected to elements in the flip-flop circuits so that while in their normal state the storage flip-flops produce a zero output but when in reversed state from being triggered, the flip-flops produce a positive square wave output (FIG. 10, wave form X). The output signal from the 8 storage flip-flop circuits are coupled to the 8 front tubes 126, respectively, of binary counter 124 through the 8 separate gate circuits 191—198, respectively. Gate circuits 191—198 which are normally operative to block passage of signals therethrough perform a dual function, the first being that signals are prevented from reaching for injection the front tube array 128 of counter 124 when the storage flip-flops 171—178 are triggered by character selection or format signal combinations rather than by word space combinations, and the second being that signals are prevented from prematurely reaching for injection the front tube array 128 before a counting run has been completed.

The gate circuits 191—198 are adapted to accomplish the two functions just mentioned by means of a word space code injector circuit 199 which may be a conventional double coincidence circuit. The word space code injector circuit receives as the first input on the lead 200 the positive square wave output (FIG. 10, wave form P) of the word space signal generator 121 (FIG. 2) and receives as a second input a positive square wave output (FIG. 10, wave form U inverted) from the exposure flip-flop 141. When a coincidence condition is established in word space injector 199 by the simultaneous presence of both of the positive square wave inputs (as shown in FIG. 10, wave form Y, right hand portion, where the solid line indicates the signal from the exposure flip-flop and the dotted line the input from the word space signal generator), word space code injector 199 produces a positive square wave output signal (FIG. 10, wave form Z) which is applied to all of gate circuits 191—198 to render all of the same conductive of signals appearing at the outputs of storage flip-flops 181—188. As a consequence, during the duration of the positive output signals from word space code injector 199, the binary code signal combination stored by flip-flops 181—188 will be injected into the front array 128 of binary counter 124.

Comparison of FIG. 10 wave forms R and Z indicates that the mentioned injection action is completed, subsequent to reception of the counter input pulse causing resetting of the counter, but previous to reception of the next counter input pulse and that injection takes place at no other time. As a consequence following a particular injection of a complement code, counter 124 will make a full counting run unbroken by spurious later injected signals interfering with the run to cause wrong positioning of the next character printed.

When a code group scanned on the tape indicates that the carriage 45 should be shifted for a new line, no complement binary code will be injected into the front tubes 126 of the binary counter 124 since none is received either from the word space channels or from the character selection channels. As a result, absent an arrangement which provides otherwise, upon completion of the new line shift, the binary counter would register an accumulation of pulses from indicia scanning photocell 134 all the way from 0 setting to the reset total before the counter would produce an output pulse to cause printing of a character. Obviously such a mode of operation would be undesirable since the left hand character of a new line should be printed as soon as the farthest left indicium 131 is scanned by photocell 134 to produce a pulse.

An arrangement which provides the above mentioned desired mode of operation comprises (FIG. 3) the new line control system 202, the new line flip-flop circuit 203, the switching pair 138 having separate sections 137 and 204 and the delay circuit 205. The new line flip-flop circuit 203 which may be a conventional bistable circuit of a type later described, oppositely controls the conductivity of switch sections 137 and 204, both of which receive as inputs the train of pulses developed by photocell 134, the output of section 137 being connected to the input counter 124 and the output of section 204 being connected to the input of exposure flip-flop 141. Ordinarily, new line flip-flop 203 is energized to render switch sections 137 and 204 conducting and non-conducting, respectively. When new line control system 202 receives, however, by lead 206 a signal from one of the tubes of switch bank 108 indicating that a new line of printing should be effectuated, the new line control system 202 produces an output pulse which reverses the states of new line flip-flop 203. As a consequence, switch sections 137 and 204 reverse conductivity conditions respectively, with the further result that the first pulse subsequently developed by photocell 134 will be routed to exposure flip-flop 141. This first pulse, corresponding to farthest left indicium 131, when so developed operates on exposure flip-flop 141 and the following portion of the circuit, in the same manner as a pulse derived from the output of delay circuit 140, to produce the printing of a character 34 previously exposed on font grid 27.

Additionally the first pulse produced by photocell 134 is applied through delay circuit 205 to new line flip-flop 203 restoring the flip-flop circuit to its original condition in which switch sections 137 and 204 are held conducting and non-conducting, respectively. As a result subsequent pulses from photocell 134 once again will be fed to the input of counter 124.

*The Adder Circuit*

The adder circuit 144 is adapted to provide an output pulse (FIG. 10, wave form W) whenever an input pulse is fed thereto from any of a plurality of sources including the exposure flip-flop 141 (FIG. 10, wave form V), the new line control system 202 and other format operation control systems (not shown). In each case, the input pulse received from adder circuit 144 signifies the completion of an operation such as the printing of a character, the production of a word space, or the production of a new line or change in point size of type, for example.

The output pulse of added circuit 144 is fed by a lead 207 to a plurality of branch leads which in turn distribute the output signal to the transfer circuits 115 and 116 (FIG. 2) the word space signal generator 121, (FIG. 2) and the array of storage flip-flops 181—188 (FIG. 3). The effect of the reception of the adder output pulse on each of the mentioned circuits is to restore the same to their original condition if their original condition has been altered to a reversed state condition responsive to a signal combination developed by photocells 63—71. Thus in the case of transfer circuits 115, 116 and word space signal generator 121, where format and word space signal combinations respectively have induced a transient square wave output, these square waves will be terminated by the adder pulse. In the case of storage flip-flops 181—188, where any of the flip-flop circuits have been triggered to produce positive signal outputs, the adder pulse returns the triggered flip-flops to the zero signal output state.

Additionally, the adder output pulse is used for two further purposes. First, it is used to terminate the energized state (FIG. 10, wave form J) of shutter actuating control systems, for example shutter control system 109, which may be energized. Second, it is used in a manner later described to initiate movement (FIG. 1) of tape 54 for advancing a new code group row 61 into scanning position.

Figure 4:
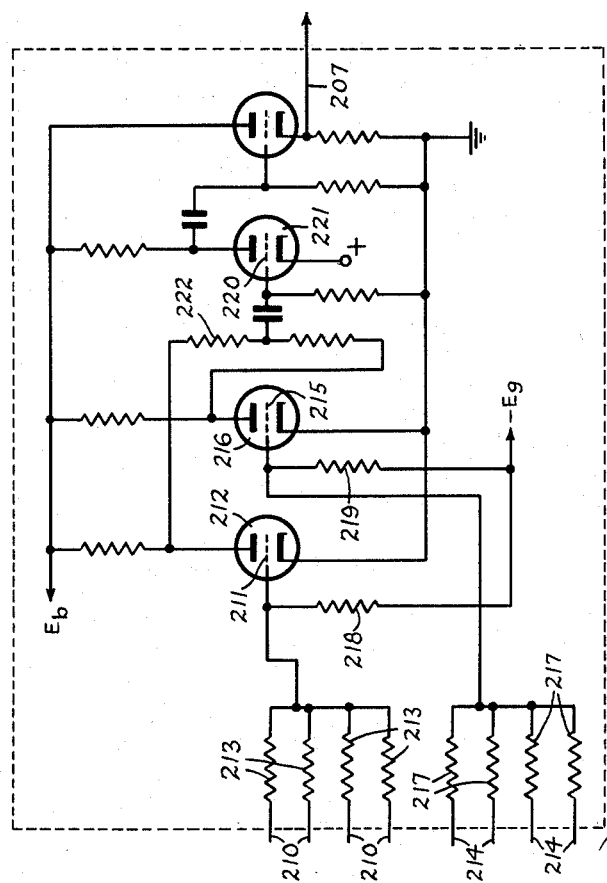
FIG. 4 is a schematic diagram of the adder circuit.

Referring now to FIG. 4 which shows the adder circuit 144 in detail, leads carrying the various signals indicating completion of an operation are split into two groups, one group of leads 210 being coupled to the grid 211 of a conventional amplifier tube 212 by means of decoupling resistors 213 in each lead and the other group of leads 214 being connected to the grid 215 of a conventional amplifier tube 216 by means of decoupling resistors 217 in each lead. In order to suppress amplification of negative input pulses, grids 211 and 215 are normally biased slightly below cut-off by a connection to a negative voltage supply (not shown) through resistors 218 and 219 respectively. The plate of amplifier 212 is connected to the grid 220 of a third conventional amplifier tube 221 through a resistor 222, the plate of amplifier 216 being similarly connected to grid 220 by resistor 223. Resistors 222 and 223 thereby form a voltage divider circuit between tubes 212 and 216 with grid 220 being connected to the mid-point of the divider circuit.

In operation if a positive signal appears on any one of the leads connected through decoupling resistors 213 to the grid of tube 212 or connected through decoupling resistors 217 to the grid of tube 216, the plate voltage of the tube receiving the signal will be driven considerably below the plate voltage of the other tube. As a result, the grid 220 of amplifier 221 will also be driven down causing a positive output pulse at the plate of amplifier 221. This pulse is passed through a tube 222 connected as a conventional cathode follower to appear as the adder output on lead 207.

*The Tape Movement Control System*

As mentioned, the adder circuit 144 is used to initiate movement of the tape 54. To describe this action generally, the pulse output from the added 144 is fed (FIG. 2 to the tape movement flip-flop 103 which acts to release the brake 59 on the shaft of the tape feeding sprocket 56 and to engage the clutch 58 to couple the sprocket 56 to the motor 57. This causes the sprocket 56 to advance the tape 54 until the next sprocket hole 55 is scanned by the photocell 72. When this happens, a pulse is produced which is fed through the pulse generator 82 to the tape movement flip-flop 103 which causes the clutch 58 to release and the brake 59 to engage once again, so that the new code on the tape may be scanned to initiate specified operations of the apparatus.

Considering now in more detail the tape movement control system, the clutch 58 and brake 59 (FIG. 2) may be of the well-known type in which magnetic material such as iron filings dispersed throughout a medium such as oil, for example, is adapted to be influenced by magnetic fields generated by the windings (FIG. 5) 225 and 226. The windings 225 and 226 may be connected together at one end to the positive terminal of a suitable source of electrical energy (not shown) and their other ends may be connected to the plates 227 and 228, respectively, of a conventional double triode 229, the cathodes 231 and 232 of which are grounded, as shown. The grids 233 and 234 of the triode 229 are adapted to be biased oppositely by separate voltages on the plates 235 and 236 on left hand tube section 237 and right hand tube section 238, respectively, of a double triode 239 connected as a bistable multivibrator generally designated by 240, the mentioned sections having grids 241 and 242 respectively. The multivibrator 240 is connected in the usual manner to the resistors 243, 244, 245, 246, 247 and 248 and the condensers 249 and 250. Multivibrator 240 is one component of the tape movement flip-flop circuit 103, the other components of which are the trigger injection triodes 251 and 252.

The plate 236 of right hand section 238 is connected to ground through the series combination of resistors 253 and 254, the junction point of these resistors also being connected to ground through the gas filled diode 255. Upon conduction of right hand section 238 and thus lowering of the potential at the junction of resistors 243 and 245, the voltage across the electrodes of the diode 255 is insufficient to maintain a discharge across the same, and hence, diode 255 will appear dark. Conversely, upon new conduction of right section 238, sufficient voltage is furnished across the diode electrodes 255 to cause the diode to conduct with an accompanying luminous. The diode 255 accordingly provides a convenient indicator of the state of conductivity of the multivibrator 240.

Since the circuit arrangement of tape movement flip-flop circuit 103 is essentially similar to the circuit arrangements of storage flip-flop circuits 181—188, a detailed description of storage flip-flops 181—188, accordingly, is not considered necessary.

When a positive pulse is generated by the added circuit (FIG. 4) upon the completion of a particular operation such as the exposure of a character, for example, this pulse is fed through conductors 207 (FIGS. 4 and 2) and 256 (FIGS. 2 and 5) to the control grid 257 (FIG. 5) of trigger injection triode 252, control grid 257 being normally biased slightly below cut-off by a connection to a negative voltage supply not shown through resistor 258, the plate 259 of triode 252 being connected to the junction between the resistors 244 and 246. Reception of the adder output pulse alters the operating conditions existing in the multivibrator circuit 240 in such fashion that opposed potentials are applied to the grids 233 and 234 of the double triode 229 to deenergize the brake winding 59 and to simultaneously energize the clutch winding 58. Therefore, the brake is now released and the clutch is engaged so that the motor 57 (FIG. 2) can drive the tape 54 to the next scanning position.

Upon arrival of the tape 54 at the next scanning position, the photosensitive device 72 (FIG. 2) scans the next sprocket hole 55 while it is partially but not fully in scanning position to produce an interval of falling plate voltage for the photocell 72 (FIG. 10, portion $a$ of wave form A). The photocell output signal portion corresponding to this interval of falling voltage is fed to pulse generator 82 (FIG. 5) where it is differentiated by condenser 261 and resistor 262 to produce a negative pulse. The negative pulse thus produced is fed to the zero grid biased conventional amplifier tube 263 which tube inverts negative pulse inputs and additionally suppresses passage of positive pulse inputs, generated by photocell 72 at the end of a scan when its plate voltage rises, as a code group on tape 54, is partially but not fully pulled out of scanning position (FIG. 10, portion $b$ of wave form A).

The amplified positive pulse produced at the output of amplifier tube 263 is further amplified and reversed in the amplifier 264. The reversed pulse is then inverted in a conventional amplifier output 265, the positive pulse signal at the plate of which is fed as an output of pulse generator 82 (FIG. 10, wave form C) to an input of tape movement flip-flop 103. In tape movement flip-flop 103, the positive pulse received from pulse generator 82 is applied to the grid 266 of the trigger injection triode 251, the output signal of which is fed to the junction point between the resistors 243 and 245 in multivibrator circuit 240. The output signal of trigger injection triode 251 again changes the operating conditions of the multivibrator 240 to reverse the opposed potentials applied to the grids 233 and 234 of the double triode 229, resulting in the energization of the brake winding 59 and the deenergization of the clutch winding 58. At this time, the brake is again applied to the sprocket 56 (FIG. 2) and the clutch 58 is disengaged so that the tape 54 remains at rest in the new scanning position.

The Operation Selection Circuits

For purposes of illustration there is shown in detail in FIGURE 6, portions of switch bank circuits 107, 108, the transfer circuit 115 and the cut-off circuit 122, which circuits together co-act to select the type of operation performed by the system, namely character selection, format or word space operation. It will be understood that the arrangement for switch banks 112, 113, transfer circuit 116 and cut-off circuit 123 is essentially similar to the arrangement disclosed in FIGURE 6.

Considering now FIG. 6, a first conductor 106, which may be designated 106$a$, is connected to the control grids 271 and 272 of a pair of discharge tubes 273 and 274 located in switch banks 107 and 108 respectively, the cathodes 275 and 276 of tubes 273 and 274 being connected to ground. The plate 277 of the tube 273 is connected in series with a load resistor 279 to a suitable source of electrical energy to be described and by a conductor 281 to the shutter control system 109 to be described below, for actuating one of the shutters 46 (FIG. 1).

The plate 278 of the tube 274 is connected in series with a load resistor 280 to a suitable source of electrical energy to be described and by the conductor 206 to new line control system 202 for causing a new line of printing to be composed upon the photosensitive medium 41.

The transfer circuit 115 may be a conventional gas tube flip-flop circuit comprising two gaseous discharge tubes 285 and 286 of the thyratron type, for example, the characteristics of the circuit being such that if one tube conducts the other tube is non-conducting. Tubes 285 and 286 have plates 287 and 288, respectively, and control grids 289 and 290, respectively, associated therewith. The plates 287 and 288 are coupled to a suitable source of voltage supply later described by two resistors 291 and 292, respectively, and to each other through a condenser 293. By reason of the condenser coupling, when the non-conducting tube of the pair is fired to conduct, its drop in plate voltage is transferred over to the plate of the other tube to thereby extinguish the same.

Primary control grid 289 of tube 285 is coupled by lead 294 and condenser 295 to the output of differentiating circuit 114. Similarly primary control grid 290 of the tube 286 is coupled by lead 296 and condenser 297 to main lead 207 (FIG. 2) which distributes the adder output pulse. Grids 289 and 290 are normally maintained below the firing grid voltage of tubes 285 and 286 by connection through resistors 298 and 299 to a source of negative grid biasing voltage supply (not shown). Since tubes 285 and 286 are gaseous discharge tubes, after one of the tubes has fired, the quiescent voltage on its grid is ineffective to stop the discharge.

Tube 286 in addition to the other elements mentioned, has a secondary control grid 301 connected to the junction of a condenser 302 and a resistor 303 the series combination being connected between the source of operating voltage and the negative grid biasing voltage supply. Upon impression of plate voltage on the transfer circuit 115, secondary grid 301 by the coupling of condenser 302 will, for a short period, be raised sharply in potential. As a consequence, tube 286 will fire to conduct in spite of the quiescent negative bias impressed upon primary control grid 290. Once tube 286 has fired, in a manner common to gas discharge tubes, primary control grid 290 loses its controlling affect. Hence, upon initial energization or reenergization of transfer circuit 115, tube 286 will always initially conduct.

Operating voltages for switch bank tubes 273 and 274 are supplied to their plate resistors 279 and 280 through conductors 305 and 306 connected to the plates of tubes 285 and 286 respectively. Upon initial energization or for a character selection operation tubes 285 and 286 are in a condition of non-conduction and conduction respectively, with the result that tubes 273 and 274 are supplied with operating voltages sufficient and insufficient to pass signals on the grids thereof. As a consequence a signal appearing on conductor 106$a$ will be transferred through tube 273 to appear on lead 281 to operate shutter control system 109 but will not be transferred through tube 274 to operate new line control system 202.

When a code group row 61 of the format operation type appears on tape 54 in the scanning position (FIG. 2) a positive pulse will be received by grid 289 from differentiating circuit 114 by way of conductor 294 and condenser 295. The positive pulse so received causes a reversal of the conductivity states of tubes 285 and 286 which in turn reverses the operability of tubes 273 and 274 to transfer signals. As a consequence a signal appearing on lead 106a will now be blocked from transfer through tube 273 but will be transferred through tube 274 to appear on lead 206 to cause actuation of the new line control system 202.

Upon completion of the new line operation a positive adder output pulse will be transmitted by lead 296 and condenser 297 to grid 290 of tube 286, the adder output causing a second reversal of conductivity states of tubes 285 and 286 to restore them to their conditions originally maintained before the reception of the positive pulse from differentiating circuit 114.

Other pairs of tubes, the separate members of the pair being in switch banks 107 and 108 respectively, as for example tubes 307 and 308 may be connected to receive on their grids the signal from another conductor 106, as for example, conductor 106b and to derive their operating voltage from conductors 305 and 306 respectively. The output of tube 307 may be connected to another shutter control system (not shown) for actuating a shutter 46 while the output of tube 308 may be connected to another format operation control device (not shown) as, for example, a device for changing the point size of type.

The cut-off circuit 122 may comprise, for example, an electron discharge device 310, the plate 311 of which receives voltage from a suitable source (not shown) through a resistor 312, the cathode 313 of which is connected to the negative pole of the voltage source and the grid 314 of which is coupled to the output of the word space signal generator 121 by a lead 123a. The resistors 291 and 292 in the transfer circuit 115 are connected to the plate 311 of the tube 310, and the cut-off circuit 122 is so designed that normally the tube 310 is non-conducting. Under these conditions, the voltage at the plate 311 of tube 310 is of a value to supply sufficient plate voltage to render transfer circuit tubes 285 and 286 operative. However, upon receipt of a positive square wave at the grid 314 from word space signal generator 121, the tube 310 becomes conducting at which time its plate voltage drops to a relatively low value to render wholly inoperative transfer circuit tubes 285, 286, switch bank tubes 273, 274, 307, 308 and the other tubes in switch banks 107 and 108.

*Details of Word Space Circuits*

Referring now to FIG. 7 which shows in detail the circuits for producing the positive square waves for operating cut-off circuits 122 and 123 and also the circuits permitting injection of word space codes into counter 124, in word space detector circuit 120 shown in the upper left hand corner of FIG. 7, the outputs of gates 83—86 are connected by the set of leads 118 through decoupling resistors 320, one for each lead, and through the conventional coupling of condenser 321 and resistor 322 to the grid of a conventional amplifier tube 323. The output of amplifier tube 323 is conventionally coupled to a second conventional amplifier tube 324, the output of which is coupled by condenser 325 to the suppressor grid of coincidence tube 326 which may be a pentode with its suppressor grid normally biased negative by a connection through resistor 327 to a source of negative grid biasing voltage supply (not shown).

Similarly the outputs of gate circuits 88—91 are connected by a set of leads 119 through decoupling resistors 330, one for each lead and through the conventional coupling of condenser 331 and resistor 332 to the grid of a conventional amplifier tube 333. The output of amplifier tube 333 is conventionally coupled to a second conventional amplifier tube 334, the output of which is coupled by condenser 335 to the control grid of the coincidence tube 326, the control grid being normally biased negative by a connection through resistor 337 to the negative grid biasing voltage supply.

The screen grid of coincidence tube 326 is connected to the output of cathode follower 97 by lead 117 and condenser 328, and to the negative grid biasing voltage supply by the resistor 339.

A positive output signal appearing at any of gates 83—86 (FIG. 10, wave form E) is amplified and reversed by amplifier 323 and is further amplified and reversed by amplifier 324 to impress a positive signal on the suppressor grid of tube 326. Similarly a positive output signal appearing at any of gates 88—91 (FIG. 10, wave form E) will be amplified and reversed by amplifier 333 and further amplified and reversed to impress a positive signal on the control grid of tube 326. Additionally a positive output signal from cathode follower 97 (FIG. 10, wave form K) will result in a positive output signal being impressed on the screen of tube 326.

When positive signals appear simultaneously on all three of the grids of coincidence tube 326 (FIG. 10, wave form N) which occurrence takes place only when a word space code group is being scanned on tape 54, a triple coincidence condition is established which permits tube 326 to conduct which in turn results in the production of a negative signal at the plate of tube 326. This negative signal is differentiated by the series connection of condenser 341 and resistance 342 and is then inverted and amplified by conventional amplifier tube 343 to appear as a positive pulse (FIG. 10, wave form O) corresponding in time with the front edge of the coincidence signal output from tube 326.

The positive pulse so produced which represents the output of word space detector circuit 120 is fed as an input signal to the word space signal generator 121 which comprises a conventional flip-flop circuit similar to previously described tape movement flip-flop 102 and which has in a similar manner as component elements two trigger injection triodes 345 and 346, a two section triode with right and left hand tube sections 348 and 349 coupled together as a multivibrator and gas filled diode 350 providing, upon energization of the flip-flop circuit, an indication of the state of conductivity of the same. Upon reception of the positive pulse from word space detector circuit 120, the trigger injection triode 345 causes a reversal in the conductivity states of tube sections 348 and 349 so that tube section 348 conducts and tube section 349 fails to conduct. The interruption in the conductivity of tube section 349 causes a positive square wave to appear at the plate thereof which square wave output is fed by lead 123a to grid 314 of tube 310 in cutoff circuit 122 (FIG. 6) and by lead 200 to word space code injector 199. The positive square wave output ceases when trigger injection triode 346 receives by way of lead 351 the positive adder output pulse which causes reversal of the conductivity of sections 348 and 349 to restore the sections to their original conditions before the positive pulse from word space detector 120 was received.

The positive square wave when led to cut-off circuit 122 operates on the same in the manner hitherto described. The positive square wave led to word space code injector 199 is applied to the suppressor grid of the coincidence tube 355 which may be a pentode otherwise conventionally connected. The control grid of coincidence tube 355 (by a conventional coupling) is adapted to receive over a lead 356 a positive square wave signal from exposure flip-flop 141.

Considering for a moment exposure flip-flop 141, the circuit consists of the triode 360 with its plate connected through resistor 361 to a source of operating voltage (not shown) and the double triode 362 with left and right sections 363 and 364 both connected to the operating voltage source through a resistor 365. The control grid of triode 360 is statically biased highly positive by a connection to the operating voltage source through a resistor 366 while the control grid of section 364 is biased quite far below cut-off by a connection to the junction of resistors 367 and 368 which extend in series combination between the plate of triode 360 and a first source of negative grid biasing voltage supply (not shown). Triode 360 and section 364 are coupled as a multivibrator by condensers 369 and 370 which for transient signals closely couple the plate of triode 360 to the grid of section 364 and the plate of section 364 to the grid of triode 360 respectively. The section 363 of double triode 362 acts as a trigger injection device, the grid of section 363 being biased slightly below cut-off by a connection through resistor 372 to a second source of negative grid biasing voltage (not shown).

Ordinarily triode 360 conducts and section 364 does not conduct. Upon reception from delay circuit 140 by way of lead 140a of the delayed positive output pulse of counter 124, in a well-known manner the pulse is inverted by section 363 and coupled through condenser 370 over to the grid of triode 360 to cut the same off, the rising plate voltage of which is in turn coupled over by condenser 369 to the grid of section 364 to cause the same to conduct, the falling plate voltage of section 364 in turn being coupled through condenser 370 to drive the grid of triode 360 further downward in potential. The action described is cumulative with the result that the grid of triode 360 is initially driven far below cut-off and then gradually rises in potential as current leaks through resistor 365 into condenser 370 until the cut-off point again is reached, at which time triode 360 again conducts and section 364 ends its conduction. In the interim a negative and a positive square wave output are available respectively from the plates of section 364 and triode 360, the negative square wave being coupled by lead 141a (FIG. 3) to amplifier 142 and differentiating circuit 143 and the positive square wave being coupled by lead 356 (FIG. 3) to the word space code injector 199.

The exposure flip-flop circuit 141 just described is a conventional monostable type of flip-flop circuit essentially similar to other monostable flip-flop circuits used in the system as, for example, first gating flip-flop 92 and second gating flip-flop 102, which accordingly are not described in detail.

Returning to a consideration of the word space code injector 199, the positive square wave of exposure flip-flop 141 is fed as input to word space code injector 199 by being impressed through a conventional coupling circuit upon the control grid of coincidence tube 355. When the positive square wave signals of word space signal generator 121 and exposure flip-flop 141 appear contemporaneously upon the respective grids of coincidence tube 355, which occurrence only takes place if a word space code group is in scanning position on tape 54 (FIG. 2) and shortly after the output pulse from counter 124, then coincidence tube 355 produces at its plate a negative output signal. This negative output signal is inverted in conventional amplifier 375 and applied as a positive gate signal to the inputs of gate circuits 191—198, of which only the gate circuit 191 for simplicity is shown in FIG. 7.

As an input to gate circuit 191, the positive gate signal is impressed through a conventional coupling circuit upon the suppressor grid of tube 380 connected as a cathode follower, the suppressor grid statically being biased negative by a connection to a source of negative grid biasing voltage (not shown). Concurrent with the appearance of the positive gating signal upon the suppressor grid, a positive word space code signal will be applied upon the control grid of tube 380 from corresponding storage flip-flop 181 (FIG. 3) if the flip-flop has been triggered by a signal at the output of gate circuit 83 (FIG. 2). Assuming that storage flip-flop 181 has been so triggered, during the duration of the positive gate signal, tube 380 will have a positive output signal which is injected as one element of a word space complement code into a front tube 126 (FIG. 3) of binary counter 124.

*The Shutter Control Mechanism*

As stated, any particular character 34 on the font grid 27 (FIG. 1) can be made available for exposure by actuating any selected pair of shutters 46 and 51. The signal for actuating the pair to be selected at any instant is derived from the matrices 105 and 110 (FIG. 2). Typical mechanism for actuating a shutter 46 for the entire row in which a selected character is located in response to a signal from the matrix 105 (FIG. 2) is shown schematically in FIG. 8. Since substantially the same apparatus is employed for actuating the shutter 51 for the column in which the selected character appears, in response to a signal from the matrix 110, such apparatus need not be described in detail herein or illustrated in the drawings.

Considering now FIG. 8 which describes in detail the circuits for shutter control system 169 (FIG. 2) the solenoid 390 in a solenoid valve 48 (FIG. 1), corresponding to a particular shutter 46 required to be actuated to expose the row of characters in which the selected character appears, may be connected between a source of operating voltage (not shown) and the plate of a conventional gas discharge device 391. The plate of the gas discharge device 391 is connected to the plate of a second gas discharge device 392 by a condenser 392a. The cathodes of tubes 391 and 392 are connected to ground while the grids of the same are quiescently negatively biased below the cut-off point by connection through resistors 393 and 394, respectively, to a negative grid biasing supply (not shown). Like tube 286 of transfer circuit 115 (FIG. 6) the tube 392 has a secondary control grid connected to the junction of a condenser 395 and a resistor 396 in series, the series combination being connected between the source of operating voltage and the source of negative grid biasing voltage. Hence, for the reasons stated with respect to transfer circuit 115 normally the tube 392 is conducting and the tube 391 is non-conducting. Under these conditions no current is passed through the solenoid 390 with the result that the corresponding shutter 46 remains closed.

When the code elements on the tape 54 corresponding to a selected character are scanned by the appropriate phototubes (FIG. 1) a signal is produced at the plate 277 of the corresponding tube 273 (FIG. 6). This pulse is applied through the conductor 281 to the differentiating circuit (FIG. 8) comprising condenser 400 and resistor 401 which produce a positive pulse coincident with the front edge of the output signal from tube 273. This positive signal is applied to the control grid of trigger injection triode 401a, which is part of a conventional flip-flop circuit, the other components of the flip-flop circuit being the trigger injection triode 402, the gas filled diode 403, and the double triode 404 with left and right hand sections 405 and 406 coupled together as a bistable multivibrator, together with associated resistors and condensers. Since the circuits incorporating the tubes 401, 402, 403 and 404 are essentially similar to these disclosed for tape movement flip-flop circuit 103, it is not necessary to review again their details. Upon ordinary energization right hand tube section 406 of double triode 404 will conduct while left hand section 405 will not conduct.

The plates 407 and 408 of left and right hand tube sections 405 and 406, respectively, are coupled to the grids 409 and 410 of a double triode 411, the plates 412 and 413 of which are connected through low resistors 414 and 415 to a positive source of voltage supply (not shown) and the cathodes 416 and 417 of which are connected to ground as shown. The plates 412 and 413 are also connected by conventional coupling means to the primary control grid of the gas discharge devices 391 and 392.

Upon reception of a positive pulse from lead 281 by trigger injection triode 401a, there is a reversal of conducting states so that the left hand tube section 405 is rendered conducting and right hand tube section 406 nonconducting. The decrease in voltage at the plate of left hand tube section 405 impresses a negative voltage upon grid 409 of double triode 411 which negative grid voltage in turn produces a positive output pulse from plate 412 of double triode 411 which positive output pulse in turn causes ignition of gas discharge device 391. As a consequence of the ignition of tube 391 current now flows through valve solenoid 390 causing the shutter 46 corresponding thereto to be extended by the flow of air to piston 48a to uncover (FIG. 1A) the print spaces 32 in its corresponding row. The corresponding shutter 51 is opened in a similar manner. The shutters 46 and 51 now remain open until the character is to be exposed at which time a square wave is generated by exposure flip-flop 141 (FIG. 3) which energizes the lamp 20 and which results at the end of the square wave in the production of a pulse in the output of the adder circuit 144.

The pulse from the adder circuit 144, by lead 416 and a conventional coupling circuit, is applied to the grid of trigger injection triode 402. As a result, the opposed potentials applied by left and right hand sections 405 and 406 to the grids 409 and 410 of the double triode 411 are reversed so that a positive pulse is impressed upon the grid of the gas discharge tube 392, while a negative pulse is applied to the grid of the gas discharge device 391. Once again, the current through the valve solenoid 390 is shut off to reverse the side of piston 48a to which air is fed so that the shutter 46 is retracted to cover (FIG. 1A) the print spaces 32 in its corresponding row.

*The New Line Positioning Mechanism*

As mentioned heretofore the carriage 45 carrying with it the photosensitive medium 41 and platen 43 may be given a substantially continuous horizontal motion from right to left as viewed from the lamp 20 (which vantage point will be considered the standard viewing direction for the rest of the description) and a fly back motion from left to right. Further, the platen 43 carrying with it the photosensitive medium 41 may be given an intermittent upward step by step motion and a downward fly back motion.

While the horizontal movement mechanism may be any arrangement well known to the art, the mechanism is shown in FIG. 1 as a continuously rotating electric motor 500 which drives (through a normally energized fluid magnetic clutch 501 similar to clutch 58, FIG. 2) a pinion 502 which engages horizontal rack 503 affixed to carriage 45 to move carriage 45 from right to left against the tension of fly back or return spring 504. This horizontal movement of carriage 45 continues until a new line code group 61 on tape 54 (FIG. 2) is in scanning position, at which time the clutch 501 is deenergized and carriage 45 flies back or is returned from left to right by the spring 504 until it reaches the right hand end of travel, at which point the farthest left indicium 131 on member 130 is a distance to the right of the light path from light source 132 to scanning photocell 134. Upon reaching the right hand end of travel the right edge of carriage 45 strikes a position sensing device 506 which may be a conventional microswitch or the like. Position sensing device 506 in a manner to be later described causes a reenergization of clutch 501 which in turn effects resumption of the substantially continuous horizontal right to left motion of the carriage 45. The sequence of events involved in a new line operation is completed when carriage 45 moves sufficiently to the left so that the farthest left indicium 131 of member 130 registers with the light path from light source 132 to photocell 134.

The vertical positioning mechanism which also may be any arrangement well known to the art is shown in FIG. 1 as a pinion 510 engaging a vertically disposed rack 511 affixed to platen 43. The pinion 510 is carried on a shaft 512 for rotation therewith, shaft 512 being journalled in a mounting on carriage 45. Shaft 512 is coupled through a magnetic clutch 513 to the output of a differential unit 514 adapted to receive inputs from two motors 515 and 516. With clutch 513 energized, selected unit rotary inputs from motors 515 and 516 will cause respectively platen 43 to be raised a standard space between lines and to be changed some preselected fraction of a standard space between lines. Hence, by selecting a number of forward or backward unit inputs of motor 516 for each unit input of motor 515, variance in space between lines can be altered, a space between lines being produced each time motors 515 and 516 are energized. By deenergizing clutch 513, the platen 43 can be caused to drop under gravity to a starting position for a new page.

When a new line of printing is desired on photosensitive medium 41 the elements of the horizontal movement mechanism and the elements of the vertical positioning mechanism must be properly synchronized in their respective actions so that carriage 45 carrying platen 43 and medium 41 is moved horizontally to a position appropriate for starting a new line and so that platen 43 carrying medium 41 is raised upward a step to a position appropriate for starting a new line. The system which coordinates the actions of the elements of the horizontal movement and vertical positioning mechanism to give the desired effects as described is shown in detail in FIG. 9.

Referring now to FIG. 9 when a new line code group 61 is in scanning position on tape 54 (FIG. 2) in the manner previously described a positive output signal will appear on lead 206 of tube 274 (FIG. 6). This positive output signal on lead 206 is applied (FIG. 9) to the set of circuits 202 comprising the horizontal shift flip-flop 520, the amplifiers 521 and 522 and the gas tube flip-flop 523. The mentioned component circuits are analogous respectively to the component circuits of the shutter control system (FIG. 8) including the flip-flop circuit made up of tubes 401a, 402, 403 and 404, the two sections 409 and 410 of double triode 411 and the gas tube flip-flop including 391 and 392. In response to the positive input signal on lead 206 horizontal shift flip-flop 520 reverses its normally maintained conductivity state to cause amplifier 521 to produce a positive square wave output, amplifier 522 a negative square wave output and gas tube flip-flop 523 a negative square wave output. The negative square wave output from gas tube flip-flop 523 is applied to clutch 501 resulting in deenergization of the same which permits (FIG. 1) the fly back motion from left to right of carriage 45. At the same time the negative square wave output of amplifier 522 is applied to normally unblocked gate circuit 136 (FIG. 3) to suppress the passage therethrough of signals from indicia scanning photocell 134. As a result, during fly back the light pulses picked up by photocell 134 as successive indicia 131 interrupt the light path thereto will not be fed to the input of counter 124 to cause a false count to be registered therein.

The positive square wave from amplifier 521 as well as being applied to gas tube flip-flop 523 is additionally applied to a differentiating circuit 524 which produces as an output a positive pulse contemporaneously with the rising voltage front edge of the positive square wave input. The positive pulse so produced is applied to new line flip-flop circuit 203 which routes the first light pulse generated by photocell 134 (FIG. 3) to exposure flip-flop 141 in the manner previously described after the horizontal fly back has been completed.

The positive signal appearing on lead 206 is also applied to the set of circuits comprising vertical raise flip-flop 530, amplifiers 531 and 532 and gas tube flip-flop 533. The mentioned components of this set of circuits are similar to analogous component circuits of the shutter control system (FIG. 8) with the exception of the vertical raise flip-flop 530 which is a monostable type of flip-flop circuit similar in detail to the exposure flip-flop 141 (FIG. 7). Upon receiving the positive signal from lead 206 vertical raise flip-flop 530 transiently reverses conductivity to cause gas tube flip-flop 533 by conventional means not shown to energize motors 515 and 516 to produce, respectively, rotary unit output and a preselected number of forward or backward unit outputs. The motors 515 and 516 thereupon raise platen 43 and photosensitive medium 41 one step upward in the manner described by a selected space between lines. After a short time period vertical raise flip-flop 530, by virtue of its internal characteristics, again reverses conductivity to revert to its original condition.

During the fly back motion of carriage 45 horizontal shift flip-flop 520 remains in the reversed state condition to which it has been driven by the signal on lead 206 with the result that clutch 501 remains deenergized and gate circuit 136 remains blocked to prevent passage of signals therethrough. When the right hand edge of carriage 45 strikes position sensing device 506, however (FIG. 1), the position sensing device 506 feeds a positive input pulse to flip-flop 520 which thereupon by a second reversal of conductivity reverts to its originally maintained conductivity condition. The positive square wave output from amplifier 521 and the negative square wave output from amplifier 522 and gas tube flip-flop 523 are thereupon terminated with the result that clutch 501 is reenergized and gate 136 is unblocked to permit signal passage therethrough. Additionally, the differentiating circuit 534 which has an input connected to the output of amplifier 522 and an output connected to one of the inputs of adder 144 produces a positive pulse contemporaneous with the rising voltage back edge of the negative square wave at the output of amplifier 522. This positive pulse so produced is fed to the adder 144 which thereupon in the manner previously described causes a new code group row 61 (for example a character code group) on tape 54 to be advanced into scanning position. The new line flip-flop 203 remains unaffected by the termination of the intermittent action of horizontal shift flip-flop 520.

Since the clutch 501 is reenergized upon contact of the right hand edge of platen 43 with position sensing device 506, the carriage 45 resumes its regular horizontal right to left composing motion. In the interval before the farthest left indicium 131 appears in the light path between light source 132 and photocell 134 (responsive to the new character code group 61 pulled into scanning position in the manner previously described) a pair of shutters 46 and 51 will be actuated to select the character 34 on font grid 27 corresponding to the new code group 61. When farthest left indicium 131 interrupts the light path between light source 132 and photocell 134, photocell 134 develops a pulse which in the manner previously described causes printing of the selected character 34 and reversion of the new line flip-flop circuit 203 to its originally maintained condition. At this juncture all of the various component actions of the new line operations may be considered to have been completed.

*Overall Operation*

In operation, the platen 43 and carriage 45 carrying the photosensitive medium 41 move at a reasonably uniform (but not necessarily constant) rate of speed along the line in which the characters are to be composed. Assume that the medium 41 has just started to move in the direction for composing a line from left to right which is to say that correspondingly the carriage 45 moves from right to left when viewed from the vantage point of lamp 20. Assume further that the farthest left indicium 131 has not yet been scanned by the phototubes 134, and that a portion of tape 54 having upon it a character code group row 61 has been advanced by the sprocket 56 so that light from the light source 62 passes through perforated tape elements 61a of the code group row 61 to fall upon appropriate ones of the photocells 63–71 inclusive causing the mentioned photocells to develop electric signals.

If the first code element on the tape 54 corresponds to the character A, for example, certain of the photocells 63–66, inclusive, and 68–71, inclusive, will produce signals but the photocell 67 will not develop any signal. The signals thus generated will be fed to the matrices 105 and 110 which will produce signals to energize circuits to cause the proper shutters 46 and 51 to be opened to expose the letter A on the font grid 27. These operations take place before the farthest left indicium 131 on the member 130 is scanned by photocell 134. When the farthest left indicium 131 on the member 130 interrupts the beam of light between the light source 132 and the photocell 134 a pulse is generated which causes the source of light 20 to flash and to expose the character A at the appropriate place on the photosensitive medium 41.

At the termination of the exposure of the letter A the adder circuit 144 produces an output pulse which actuates the tape movement flip-flop circuit 103 to cause the tape 54 to move one step to present a new series of code elements (which may correspond to the character B for example) to the phototubes 63–71 inclusive.

The code elements for the character B are detected by the photocells 63–66, inclusive, and 68–71, inclusive, producing signals which are fed to the matrices 105 and 110, thereby producing signals for energizing circuits for opening the shutters 46 and 51 corresponding to the letter B.

Meantime, while the letter A is being exposed the photocells 145–152, inclusive, are scanning the code elements 35a of the row 35 associated with the letter A (FIG. 1A) on the font grid 27 to generate signals which are injected into counter 124 as the complement binary code of the character width space necessary for the letter A, as measured in indicia intervals. The carriage 45 carrying the platen 43 and photosensitive medium 41 continues to advance and the photocell 134 generates a signal each time one of the indicia 131 interrupts the beam of light from source 132. These pulses are amplified by the amplifier 135 and are fed as inputs to the binary counter 124. When the number of pulses supplied from the photocell 134 corresponds to the character width space necessary for the character A as measured in indicia intervals, an output pulse will be generated by the counter 124, the output pulse causing resetting of the counter and initiating the chain of events causing the light source 20 to flash again, exposing the character B on the photosensitive medium 41.

Accordingly, the character B will be printed in the proper position on the photosensitive medium 41. Operating conditions are so chosen that when the narrowest character is exposed there will still be sufficient time for the next character to be selected and ready for exposure before the width count of such narrowest character is completed.

When the code for a word space appears on the tape 54, this is detected by the word space detector device 120 which actuates the word space signal generator 121 to supply a signal to actuate the cut-off circuits 122 and 123 which render respectively the matrices 105 and 110 incapable of performing any of their usual operations. The signals representing the complement binary code of the width space desired are fed to the array of storage flip-flops 181–188, inclusive, to be stored therein until counter 124 produces an output pulse. Meantime, the carriage 45 carrying the member 130 continues to move until the appropriate number of indicia 131 have been scanned to produce the appropriate number of input pulses to the counter 124 which will cause resetting of the counter. When this resetting action occurs, the word space signals will be permitted to pass through gate circuits 191–198, inclusive, to be injected into the counter 124 before the counter receives the next input pulse from photocell 134.

Whether the output pulse from the counter 124 signifies the completion of a character exposure or composition of a word space, the output pulse from counter 124 drives the exposure flip-flop 141 which at the end of its transient action feeds an output pulse to the adder 144. When this occurs the adder circuit generates an output pulse which in turn provides a signal to operate the tape movement flip-flop 103. Operation of the tape movement flip-flop 103 releases the brake 59 and engages the clutch 58 causing the motor 57 to drive the tape 54 by the sprocket 56 until the next sprocket hole 55 is scanned by the amplifier 72. At that time a signal is fed from the pulse generator 82 to the tape movement flip-flop 103 (FIG. 2) which causes the brake 59 to be applied and the clutch 58 to be released so that the newly presented code elements 61a of code group row 61 on the tape 54 can be scanned by the photocells 63–71, inclusive.

Following a number of character code group rows 61 on the tape 54 there will be a code group row 61 representing a line termination which will cause the matrices 110 to energize the new line control system 202 which moves the carriage 45 carrying platen 43 and photosensitive medium 41 longitudinally a distance to a point representing in horizontal registry the start of a new line, the same new line control system 202 also causing platen 43 carrying photosensitive medium 41 to move upward a step to a point corresponding in vertical registry with the start of a new line. Other code signals on the tape 54 may cause the matrix 105 or the matrix 110 to energize circuits for producing other format operations such as, for example, altering the font or point size of type or changing over to a new column or page of print.

The invention thus provides apparatus for photocomposing editorial material in justified lines in such fashion that the number of factors on which the accuracy with which the characters are positioned depends are reduced to a minimum. Since the horizontal position of a character is a function only of the accuracy of counting indicia or lines forming a grating on the photosensitive medium, the need for maintaining a constant firm speed or for accurate timing in the control circuits is substantially eliminated.

The illustrative embodiment described above and shown in the accompanying drawings is obviously susceptible of modification in form and detail within the spirit of the invention. For example, the photosensitive medium 41 might be carried on a cylindrical drum mounted for rotation and translation along the longitudinal axis thereof, instead of the platen 43. Also, exposure of the medium 41 might be effected by a source of illumination in combination with a Kerr cell or the like, which would pass light only when pulsed in response to signals received from the counter 124 (FIG. 2). For optical efficiency the array of dots 35 associated with each character 34 on a front grid 27 may be arranged in a circle about the character 34. Other modifications will suggest themselves to persons skilled in the art. The invention, therefore, is not to be limited save as defined in the appended claims.

We claim:

1. In photocomposing apparatus, the combination of means carrying a plurality of characters, shutter means for exposing characters on said carrier means, means for imprinting characters so exposed upon a character receiving medium, mechanism for performing type-setting operations upon said medium at times other than those times when characters are imprinted on said medium, tape means bearing code elements thereon, decoding means responsive to specified code elements on said tape for actuating said shutter means to expose a selected character, and means responsive to the concurrence of said specified code elements and another code element on said tape means and denoting a type-setting operation for rendering said decoding means ineffective to actuate said shutter means and causing it to actuate said mechanism, the action of said concurrently responsive means preventing spurious actuations of, respectively, said shutter means and said mechanism when said other code element is respectively present and absent.

2. In photocomposing apparatus, the combination of means carrying a plurality of groups of different characters, optical means for focusing images of said characters at a common position in a given plane, means for moving said carrying means to bring only one of said groups of characters in operative relation to said optical means, shutter means for exposing single characters selectively for focusing by said optical means, tape means bearing code elements thereon, decoding means responsive to specified code elements on said tape means for actuating said shutter means to expose a selected character, and switching means responsive to the concurrence of said specified code elements and another code element on said tape means for rendering said decoding means ineffective to actuate said shutter means and causing it to actuate said moving means to bring another of said groups of characters in operative relation to said optical means, the action of said switching means preventing spurious exposure of a character while said moving means is causing a new group of characters to be brought into operative relation with said optical means.

3. In photocomposing apparatus, the combination of means carrying a plurality of characters thereon, optical means for focusing images of said characters at a common position in a given plane, shutter means for exposing single characters on said carrying means, lens means, means for moving said lens means into association with said optical means to alter the magnification thereof, tape means bearing code elements thereon, decoding means responsive to specified code elements on said tape means for actuating said shutter means to expose a selected character, and means responsive to the concurrence of said specified code element and another code element on said tape for rendering said decoding means ineffective to actuate said shutter means and causing it to actuate said lens moving means to move said lens means into association with said optical means.

4. In photocomposing apparatus, the combination of means carrying a plurality of characters thereon, a photosensitive medium, first means for moving said medium linearly in one direction, second means for moving said medium linearly in another direction, optical means for focusing images of said characters on said medium, shutter means for exposing single characters on said carrying means, tape means carrying code elements thereon, decoding means responsive to specified code elements on said tape means for actuating said shutter means to expose a selected character, and means responsive to the concurrence of said specified code elements and another code element on said tape means for rendering said decoding means ineffective to actuate said shutter means and causing it to actuate at least one of said first and second moving means.

5. Photocomposer apparatus comprising, tape means having impressed on its extent a succession of code group indicia adapted to induce in turn a corresponding succession of photocomposer printing operations, character selecting means responsive to indicia of a first type for producing at a common region, optical images of characters designated by said first type indicia, a photosensitive medium, means for normally producing continuous relative motion in one direction between said medium and said region for composition of a line of printing on said medium, means responsive to an indicium of a second type for disabling said continuous motion means and for producing in the opposite direction relative fly back motion between said region and medium to enable a new line of printing, and means also responsive to said second type indicium for producing a relative displacement change of preselected amount between said medium and said region in a direction normal to said continuous motion to effect spacing between successively printed lines.

6. In photocomposing apparatus, the combination of means carrying a plurality of characters thereon, a plurality of pairs of shutter means for exposing single characters on said carrying means, tape means having code elements thereon, first decoding means responsive to first specified code elements on said tape means for actuating a shutter means in a first group, second decoding means responsive to second specified code elements on said tape means for actuating a shutter means in a second group, each first group shutter means forming with each second group shutter means one of said plurality of pairs of shutter means, and third decoding means responsive to the concurrence of said first and second specified code elements and another code element on said tape means for disabling both said first and second decoding means.

7. In photocomposing apparatus, the combination of means carrying a plurality of characters, code elements mounted in association with each of said characters and denoting the width in a given direction respectively required thereby when reecived on a medium, optical means for forming images of successively selected characters and of the code elements associated therewith, a photosensitive medium retentive of said character images and movable in said direction to space said retained images apart, means mounted for equal movement with said medium in said direction, said last-named means carrying indicia spaced apart in said direction for measuring said medium movement, and means jointly responsive to the code elements associated with each given selected character and to said indicia for indicating that said medium movement has allowed on said medium the width denoted for said given character.

8. In photocomposing apparatus, the combination of means carrying a plurality of characters, code elements mounted in association with each of said characters and denoting the width in a given direction respectively required thereby when received on a medium, optical means for forming images of successively selected characters and of the code elements associated therewith, a photosensitive medium retentive of said character images and movable in said direction to space said retained images apart, light source means for projecting images of said selected characters on said photosensitive medium, means mounted for equal movement with said medium in said direction, said last-named means carrying indicia spaced apart in said direction for measuring said medium movement, and means jointly responsive to the code elements associated with each given selected character and to said indicia for actuating said light source means to project the next selected character, said actuation occurring when said medium movement has allowed on said medium the room denoted for said given character.

9. In composing apparatus adapted responsive to actuation to perform various composing operations, the combination comprising, means carrying a plurality of characters a medium adapted to receive said characters for composition thereon, a width designating means mounted in association with each one of said characters for indicating the width in specified units on a composed line required for the character, character transfer means adapted to transfer a succession of characters on said carrying means from a common region onto said medium to form a composed line thereon by relative travel between said region and said medium, measuring means adapted to furnish a progressive indication in said specified units of the relative travel between said region and said medium after the transfer of each character, and means jointly responsive to an indication derived from the width designating means of the last transferred character and to said progressive indication derived from said measuring means of the relative travel occurring after transfer of the last transferred character for establishing, by comparing said two indications, a time when said medium has undergone relative travel equal to the width required for said last-transferred character, said last-named means thereupon actuating said composing apparatus to perform a new composing operation.

10. The combination as in claim 9 further charatcerized by means operable after a given line of printing has been completed and responsive to restoration of said medium to a position where the left-hand margin for lines of printing thereon is opposite said region for actuating said composing apparatus to perform a new composing operation initiating a new line of printing.

11. In composing apparatus adapted responsive to actuation to perform various composing operations; the combination comprising, a medium adapted to receive characters for composition thereon, a presettable binary counter for counting input pulses and adapted to produce an output signal upon reaching a predetermined reset total, means carrying a plurality of characters, a width designating means mounted in association with each one of said characters and indicative in binary number of the difference between the counter reset total and the amount of width in specified units on a composed line required for the associated character, character transfer means adapted to transfer a succession of characters on said carrying means from a common region onto said medium to form a composed line thereon by relative travel between said medium and said region, an indicia grating mounted with respect to said medium to geometrically subdivide the same into a number of intervals equal in width to a specified unit apiece, means operative upon the transfer of each character and responsive to indications derived from the width designating means associated therewith to preset the binary counter with the code group number of the character transferred, scanning means fixed in position with respect to said region to scan the indicia of said grating and adapted to supply a separate input pulse to said binary counter for each indicium which passes said scanning means during said relative travel, and means responsive to each output signal of said counter for actuating said composing apparatus to perform a new composing operation.

12. The combination as in claim 11 further characterized by means responsive to the indicium marking the beginning of a new line to be composed for actuating composing apparatus to perform a new composing operation.

13. In composing apparatus adapted responsive to actuation for performing various composing operations, the combination comprising, a medium adapted to receive lines of composition including characters and word spaces, a presettable binary counter for counting input pulses and adapted to produce an output signal upon reaching a predetermined reset total, tape means bearing composing operation designators including word space designators representing apiece in binary number the difference between the counter reset total and the preselected width in specified units of a word space to appear in a composed line, means responsive to said composing operation designators for composing lines on said medium by relative travel between the same and a region at which each character and word space in a line is composed in turn on said medium, an indicia grating mounted with respect to said medium to geometrically subdivide the same into a number of intervals equal in width to a specified unit apiece, means operative upon initiation of formation of a word space and responsive to an indication derived from the word space designator initiating said formation to preset the binary counter with the binary number represented by the designator, scanning means fixed in position with said region to scan the indicia of said grating and adapted to supply a separate input pulse to said binary counter for each indicium which passes said scanning means during said relative travel, and means responsive to each output signal of said counter during word space formation for actuating said composing apparatus to end said formation to perform a new composing operation.

14. In photocomposing apparatus, the combination of means carrying a plurality of a characters thereon, a plurality of pairs of shutter means for exposing single characters on said carrying means upon joint actuations of the shutter means in given pairs a movable photosensitive medium on which images of said characters are adapted to be projected, means forming a plurality of indicia mounted for equal movement with said medium in one direction to measure the travel thereof according to the number of indicia which pass a given point, tape means having code elements thereon, first decoding means responsive to first specified code elements on said tape means for actuating a shutter means in one group, second decoding means responsive to second specified code elements on said tape means for actuating a shutter means in a second group, each first group shutter means forming with each second group shutter means one of said plurality of pairs of shutter means, means responsive to the concurrence of said first and second specified code elements and another code element designating that a word space is to be formed for disabling said first and second decoding means, presettable counter means adapted to be set to count a selected number of separate input signals before reaching its reset total, means also responsive to the concurrence of said first and second specified code elements and another code element for setting said presettable counter means to reach its reset total after counting a number of input signals commensurate with a word space width designated by said first and second specified code elements, means responsive to each indicia as it passes said given point for supplying a separate signal to said counter means to be counted thereby, and means rendered operative when said counter means reaches in count its reset total to indicate travel of said medium establishing the designated word space.

15. In photocomposing apparatus the combination of, tape means having rows of code elements thereon representing composing operations, first decoding means having a plurality of outputs and responsive to the presence of first specified code elements in each row to produce a signal on a different output thereof for each different combination of first specified code elements, second decoding means having a plurality of outputs and responsive to the presence of second specified code elements in each row to produce a signal on a different output thereof for each different combination of second specified code elements, means carrying a plurality of characters, a plurality of first shutter means respectively actuable by received output signals from said first decoding means, a plurality of second shutter means respectively actuable by received output signals from said second decoding means, each different pair of a first and second shutter means being adapted when actuated to expose a different character on said carrying means for impression of said exposed character on a composing medium, a plurality of function performing mechanisms respectively actuable by signals from at least some of the outputs of at least one decoding means to perform format operations with respect to said medium, a plurality of switching means respectively coupled to the outputs of said first and second decoding means, each of said switching means being selectively actuable between a first normally assumed condition coupling and decoupling respectively its decoding means output to the corresponding shutter means and from the corresponding function performing mechanism, if any, and a second condition reciprocal as to coupling and decoupling with the first, means responsive to the presence of a third specified code element in a row for actuating all of said switching means to assume said second condition, and means for thereafter restoring all of said switching means to said first condition.

16. In photocomposing apparatus, the combination of, tape means having rows of cods elements thereon representing composing operations, a plurality of scanning means for deriving first signals, second signals and a third signal in the presence respectively of first specified code elements, second specified code elements and a third specified code element in each row, word space means having a plurality of inputs corresponding with said plurality of scanning means and adapted to produce upon a composing medium a word space of a different width for each different combination of first and second signals received from ones of said scanning means, a normally inoperative signal transfer means interposed between each scanning means and the corresponding input of the word space means, and coincidence means responsive to the concurrent presence of at least one first signal, at least one second signal, and a third signal for simultaneously actuating all of the signal transfer circuits to permit signal transfer between ones of said scanning means and said word space means.

17. In photocomposing apparatus, the combination of, tape means having rows of code elements thereon representing composing operations, a plurality of scanning means for deriving first signals, second signals and a third signal in the presence respectively of first specified code elements, second specified code elements and a third specified code element in each row, first decoding means having a plurality of outputs and responsive to the presence of said first signals to produce a signal on a different output thereof for each different combination of first specified code elements, second decoding means having a plurality of outputs and responsive to the presence of said second signals to produce a signal on a different output thereof for each different combination of second specified code elements, means carrying a plurality of characters, a plurality of first shutter means respectively actuable by received output signals from said first decoding means, a plurality of second shutter means respectively actuable by received output signals from said second decoding means, each different pair of a first and second shutter means being adapted when actuated to expose a different character on said carrying means for impression of said exposed character on a composing medium, a plurality of function performing mechanisms respectively actuable by signals from at least some of the outputs of at least one decoding means to perform format operations with respect to said medium, a plurality of switching means respectively coupled to the outputs of said first and second decoding means, each of said switching means being adapted to assume a first normally assumed condition coupling and decoupling respectively its decoding means output to the corresponding shutter means and from the corresponding function performing mechanism, a second condition reciprocal as to coupling and decoupling with the first, and a third condition preventing signal transfer through the switching means, word space means having a plurality of inputs corresponding with said plurality of scanning means and adapted to produce upon said medium a word space of a different width for each different combination of received first and second signals, a normally inoperative signal transfer means interposed between each scanning means and the corresponding input of the word space means, coincidence means responsive to the concurrent presence of at least one first signal, at least one second signal and a third signal for rendering all of said signal transfer circuits operative to permit signal transfer and for causing all of said switching means to assume said third condition, means responsive to the presence of said third signal absent the concurrent presence of all three signals for causing said switching means to assume said second condition, and means operative after initiation of a composing operation for restoring said switching means from said second and third conditions to said first condition.

18. Photocomposer apparatus comprising, tape means bearing a series of composing operation designators including ones within a first type representing various characters, a second type representing various width word spaces, and a third type representing format operations, each designator type being mutually distinguishable by a type characteristic, tape scanning means for converting each of said designators in turn into a signal of distinctive characteristic as to the type of designator from which derived, tape travel means adapted upon successive actuations to bring successive designators into cooperation with said tape scanning means for signal conversion thereby, a photosensitive medium adapted to have composing operations effected with respect thereto including line composing operations effected by relative travel between said medium and a region where line elements including characters and word spaces are produced on said medium, means carrying a plurality of characters, each character having its required width on a composed line represented by code elements associated therewith, means responsive, only when enabled, to first type signals for selecting characters on said carrying means respectively represented by said first type signals, electro-optical means adapted when actuated to impress selected characters of said carrying means upon said medium, code element scanning means for converting code elements associated with selected characters into character width signals, function performing mechanism responsive, only when enabled, to second type signals to produce when actuated format operations with respect to said medium represented respectively by said second type signals, word space means responsive, only when enabled and actuated, to third type signals for forming word spaces on said medium, type characteristic discriminating means adapted responsive to said first, second and third type signals to enable discriminatively said character selecting means, function performing mechanism and word space means respectively, measuring means for furnishing an indication of the relative travel between said medium and said region after the initiation of a given line composing operation represented by a given designator, means jointly responsive to a signal from said code element scanning means when said character selecting means is enabled, a third type signal from said tape scanning means when said word space means is enabled, and to an indication from said measuring means, for actuating the enabled one of said character selecting means, function performing mechanism, and word space means to initiate the composing operation next following a given line composing operation, when said relative travel equals in amount the width required for the element produced on said medium during said given line composing operation, and means for thereafter actuating said tape travel means to bring a new designator into cooperation with said tape scanning means before the completion of said next following composing operation.

19. An optical system for a photocomposer comprising, a flashable light source, an optical condenser disposed in front of said source to establish from the light thereof a cone of converging light rays which come to focus in a common plane to create a focused image of said source in a common focal area in said plane, a trans-illuminable font member interposed in said cone between said condenser and plane and bearing on an optically contrasting background a plurality of indicia each in the form of an optically projectable character, said indicia being disposed at different positions on said member within the solid angle of said cone, a plurality of projecting lens means respectively corresponding to said plurality of indicia and each disposed between its respectively associated indicium and said plane to project thereto an image of the character of the respectively associated indicium, collimator means disposed beyond said plane to parallelize light rays diverging from said plane and representing an image of a character projected thereto, objective lens means disposed beyond said collimator means and operable on said parallelized light rays to bring to focus the character image represented thereby, a shutter array interposed in said cone of light rays between said condenser and said plane and adapted by shutter action to select different character images provided by the indicia on said member for projection to said plane, and means to flash said light source after a character image selection has been made by said array.

20. A photocomposer for composing lines of printing on a photosensitive medium, said photocomposer comprising, a font member bearing against an optically-contrasting background a plurality of indicia each in the form of a character, an optical system including a flashable light source, said system being adapted when said source is flashed to project focused images of the characters represented by said indicia to a common focal point having the same position in the projection direction as a portion of said medium, means adapted by producing continuous relative movement between said focal point and medium to effect a continuous sweep of said point over said medium during a succession of character image projections to said point whereby the images so projected are successively exposed to form a line of printing upon said medium, storage means for code elements designating, inter alia, successive character images to be exposed on said medium, means to read from said storage means as an electric signal each such code element when presented by said storage means to said reading means, a shutter array interposed between said light source and focal point and adapted by shutter action to select different character images provided by the indicia on said font member for projection to said focal point, self-holding drive means adapted when actuated by different ones of said signals designating character images to adjust said shutter array to select for projection the different character images corresponding to the different signals, and to maintain said array so adjusted after said signals have ceased until said drive means is operated to clear said array of the character image selection then being made thereby, width-measuring means responsive to each of successive relative movements between said focal point and said medium representing preselected width spacings on said medium for successively projected character images to flash said light source once for each such response to thereby cause projection of the character image then selected by said array, and to thereafter operate said drive means to clear said shutter array of the character image selection then being made thereby, and code element advancing means associated with said storage means and reading means and operable in timed relation with the projections of said character images to cause successive presentations by said storage means of the code elements thereon to said reading means.

21. A photocomposer for composing lines of printing on a photosensitive medium, said photocomposer comprising, a font member bearing against an optically contrasting background a plurality of indicia each in the form of a character, an optical system including a flashable light source, said system being adapted when said source is flashed to project focused images of the characters represented by said indicia to a common focal point having the same position in the projection direction as a portion of said medium, means adapted by producing continuous relative movement between said focal point and medium to effect a continuous sweep of said point over said medium during a succession of character image projections to said point whereby the images so projected are successively exposed to form a line of printing upon said medium, storage means for code elements designating, inter alia, successive character images to be exposed on said medium, means to read from said storage means as an electric signal each such code element when presented by said storage means to said reading means, a shutter array interposed between said light source and focal point and adapted by shutter action to select different character images provided by the indicia on said font member for projection to said focal point, self-holding drive means adapted when actuated by different ones of said signals designating character images to adjust said shutter array to select for projection the different character images corresponding to the different signals, and to maintain said array so adjusted after said signals have ceased until said drive means is operated to clear said array of the character image selection then being made thereby, electric circuit means operable in respect to signals supplied to said drive means to introduce a time lag between generation of said signals by said reading means and receipt of the same signals by said drive means, width-measuring means responsive to each of successive relative movements between said focal point and said medium representing preselected width spacings on said medium for successively-projected character images to flash said light source once for each such response to thereby cause projection of the character image then selected by said array, and to thereafter operate said drive means to clear said shutter array of the character image selection then being made thereby, and code element advancing means associated with said storage means and reading means and operable in timed relation with the projections of said character images to cause successive presentations by said storage means of the code elements thereon to said reading means.

22. A photocomposer for comprising lines of printing on a photosensitive medium, said photocomposer comprising, a font member bearing against an optically contrasting background a plurality of indicia each in the form of a character, an optical system including a flashable light source, said system being adapted when said source is flashed to project focused images of the characters represented by said indicia to a common focal point having the same position in the projection direction as a portion of said medium, means adapted by producing continuous relative movement between said focal point and medium to effect a contiuous sweep of said point over said medium during a successive of character image projections to said point whereby the images so projected are successively exposed to form a line of printing upon said medium, storage means for code elements designating, inter alia, successive character images to be exposed on said medium, means to read from said storage means as an electric signal each such code element when presented by said storage means to said reading means, a shutter array interposed between said light source and focal point and adapted by shutter action to select different character images provided by the indicia on said font member for projection to said focal point, self-holding drive means adapted when actuated by different ones of said signals designating character images to adjust said shutter array to select for projection different character images corresponding to the different signals, and to maintain said array so adjusted after said reading signals have ceased until said drive means is operated to clear said array of the character image selection then being made thereby, electric circuit means operably in respect to signals supplied to said drive means to introduce a time lag between generation of said last-named signals by said reading means and receipt of the same signals by said drive means, width measuring means responsive to each of successive relative movement between said focal point and said medium representing preselected width spacings of said medium for successively projected character images to flash said light source once for each such response to thereby cause projection of the character image then selected by said array, and to thereafter operate said drive means to clear said shutter array of the character image selection then being made thereby, and code element advancing means associated with said storage means and reading means to cause successive presentations by said storage means of the code elements thereon to said reading means, said advancing means being operable in timed relation with the projections of said character images and within each time period beginning and ending with the times of clearance of said shutter array of a given two successive character image selections to initiate presentation to said reading means by said storage means of the code element next following that designated the latter of said given two character image selections.

23. In a photocomposer for composing lines of printing on a photosensitive medium, the combination of, a font member bearing against an optically contrasting background a plurality of indicia each in the form of a character, optical means adapted by selective actuation thereof to select for projection to a common focal point a succession of character images derived from corresponding ones of said indicia and representating a line of printing to be exposed on said medium, said focal point having the same position in the projection direction as a portion of said medium, means mounting said medium to have a planar configuration in the vicinity of said focal point, line generating means adapted by producing continuous translational relative movement in a first direction between said focal point and said mounting means to effect a continuous sweep of said point over said medium during projection of said succession of character images whereby, said succession of images when so projected are exposed on said medium to form said line of printing, line changing means adapted when actuated, and by moving said mounting means relative to said focal point, to provide a selected amount of translational relative movement between said point and said medium in a second direction normal to said first direction to thereby permit a new line of printing to be exposed on said medium, storage means for first code elements and a following second code element, said first code elements designating, inter alia, character images to be projected to form said line of printing and said second code element designating that said line-changing means is to be actuated, and means responsive in succession to first code elements designating character images to selectively actuate said optical means to select for projection the character images so designated, and responsive thereafter to said second code element to actuate said line-changing means to produce said relative movement in said second direction between said focal point and said medium.

24. In a photocomposer for composing lines of printing on a photosensitive medium, the combination of, a font member bearing against an optically-contrasting background a plurality of indicia each in the form of a character, optical means adapted by selective actuation thereof to select for projection to a common focal point a succession of character images derived from corresponding ones of said indicia and representing a line of printing to be exposed on said medium, reversibly operable line generating means adapted when operating normally to produce continuous relative movement in a forward direction between said focal point and said medium to thereby effect a continuous sweep of said focal point over said medium during projection of said succession of character images whereby said succession of images when so projected are exposed on said medium to form said line of printing, storage means for first code elements and a following second code element, said first code elements designating, inter alia, character images to be projected to form said line of printing and said second code element designating that the operation of said line-generating means is to be reversed, means responsive in succession to first code elements designating character images to selectively actuate said optical means to select for projection the character images so designated, and responsive thereafter to said second code element to reverse the operation of said line-generating means whereby the direction of relative movement between said focal point and medium is reversed from the said forward direction, and means responsive to the return of said medium to a predetermined position relative to said focal point to change the operation of said line-generating means back to normal to thereby renew relative movement in said forward direction between said focal point and said medium.

25. In a photocomposer for composing lines of printing on a photosensitive medium, the combination of, a font member bearing against an optically-contrasting background a plurality of indicia each in the form of a character, optical means adapted by selective actuation thereof to select for projection to a common focal point a succession of character images derived from corresponding ones of said indicia and representing a line of printing to be exposed on said medium, reversibly operable line-generating means adapted when operating normally to produce continuous relative movement in a forward direction between said focal point and said medium to effect a continuous sweep of said focal point over said medium during projection of said succession of character images whereby said succession of images when so projected are exposed on said medium to form said line of printing, line-changing means adapted when actuated, and by moving said mounting means relative to said focal point, to produce a selected amount of translational relative movement between said point and said medium in a second direction normal to said first direction to thereby permit a new line of printing to be exposed on said medium, storage means for first code elements and a following second code element, said first code elements designating, inter alia, character images to be projected to form said line of printing and said second code element designating that the operation of said line-generating means is to be reversed and that said line-changing means is to be actuated, means responsive in succession to first code elements designating character images to selectively actuate said optical means to select for projection the character images so designated, and responsive thereafter to said second code element to reverse the operation of said line-generating means, whereby the direction of relative movement between said focal point and medium is reversed from said forward direction, and to actuate said line-changing means to produce said relative movement in said second direction between said focal point and said medium, and means responsive to return of said medium to a predetermined position relative to said focal point to change the operation of said line-generating means back to normal to thereby renew relative movement in said forward direction between said focal point and said medium.

26. A photocomposer for composing lines of printing on a photosensitive medium, said photocomposer comprising, a font member bearing against an optically-contrasting background a plurality of indicia each in the form of a character, an optical system including a flashable light source, said system being adapted when said source is flashed to project a succession of focused images of characters represented by successively-selected ones of said indicia to a common focal point having the same position in the projection direction as a portion of said medium, reversibly operable line-generating means adapted when operating normally to produce continuous relative movement in a forward direction between said focal point and said medium to effect a continuous sweep of said point over said medium during projection of said succession of character images whereby said succession of images when so projected are exposed on said medium to form a line of printing, width-measuring means responsive to each of successive relative movements between said focal point and medium representing preselected width spacings on said medium for successively projected character images to flash said light source once for each such response to project the then-selected character image to said focal point, means operable at the end of exposure of a line of printing on said medium to reverse the operation of said line-generating means whereby the direction of relative movement between said focal point and medium is reversed from the forward direction, means to disable said width-measuring means from flashing said light source during occurrence of said reverse relative movement, and means responsive to return of said medium to a predetermined position relative to said focal point to change the operation of said line-generating means back to normal to thereby renew relative movement in said forward direction between said focal point and said medium.

27. A phototypographical machine comprising, in combination, means for feeding therethrough a coded tape having thereon a succession of code signals representative of a composed line, means for decoding the signal on the tape as it is fed through the machine, a font plate presenting an array of type characters having preselected composing widths allocated thereto means for photographing different selected characters one after another, for composition in line, a light-sensitive film on which the characters are recorded in the order in which they are photographed, means for producing relative movement between the light-sensitive film and the photographic means for line composition, a measuring device for the line-composing movement, self-holding means responsive to decoded character identification signals to control the selection of the type characters to be photographed and, after said signals have ceased, to self-maintain each such selection until said self-holding means is cleared of the selection so being maintained, means responsive to said measuring device for timing the photographic action for the successive characters being composed in accordance with the preselected widths which have been allocated to said characters, and means to clear said self-holding means of each character selection being maintained thereby after the character corresponding to the selection has been photographed.

28. A phototypographical machine according to claim 27, wherein the font plate is stationary, wherein the character selecting means includes a shutter for exposing to light the different selected characters, and wherein the photographic means includes an imaging lens system for imaging the exposed characters at a predetermined common position regardless of their position on the font plate.

29. A phototypographical machine according to claim 28, wherein the photographic means is of the light flash variety and wherein the shutter is operated in advance of the light flash.

30. A phototypographical machine according to claim 27, wherein the relative movement between the light sensitive film and the photographic means for line composition is a continuous movement.

31. A phototypographical machine according to claim 27, wherein the the photographic means is of the light flash variety, and wherein the photographic action is timed by the flashing of the light source.

32. A phototypographical machine according to claim 27, including automatic means for reversing the relative movement between the film and photographic means after the line has been composed to restore said parts to their original starting position.

33. A phototypographical machine according to claim 32, including automatic means for reinaugurating the relative line composing movement of said parts after return to their original starting position.

34. A phototypographical machine according to claim 28, wherein the unit measuring device comprises a photoelectric cell, a light source providing a beam of light in a path which intercepts said photocell, and an intermediate grid disposed in said path between said source and cell and partaking of the line composing movement, said grid having marks formed thereon to interrupt the light beam and activate the photoelectric cell after predetermined intervals of travel of said grid relative to said cell.

35. A phototypographical machine according to claim 34, wherein the intermediate grid is formed with an opaque mark to interrupt the light beam and activate the photoelectric cell, at the start of the line composing movement of the carriage, for energizing an electric circuit which initiates the photographing of a character on the film.

36. A phototypographical machine according to claim 27, including means responsive to a decoded end-of-line signal in the coded tape for arresting the line composing movement after the last character in the line has been photographed.

37. A phototypographical machine according to claim 27, including means responsive to a decoded unit space signal in the coded tape to delay the time of photographing on the film of any individual character being composed for a time sufficient to allow the space indicated by the signal to be produced as a word space in the line of composition on the film.

38. A phototypographical machine according to claim 27, including automatic means for advancing the film after composing of each line and before the composition of the next succeeding line.

39. A phototypographical machine according to claim 38, wherein the film advancing means is responsive to a decoded signal in the coded tape.

40. In a phototypographical machine according to claim 27, a font plate carrying a plurality of different fonts of type characters and adapted to be mounted for movement to bring any selected font into photographic position.

41. A phototypographical machine equipped with the font plate recited in claim 40, including means responsive to a decoded font change signal in the coded tape for changing from one to another font of type characters.

42. In photocomposing apparatus, the combination of a font member carrying a plurality of characters, shutter means for exposing characters on said font member, means to photograph characters so exposed upon a light sensitive medium, information storage means bearing specified code elements either designating characters to be photographed on said medium or designating word spaces to be formed on said medium, an additional code element associated with said specified code elements to indicate whether said specified code elements designate a character or a word space, shutter drive means responsive to said specified code elements for actuating said code means to expose characters respectively corresponding to said specified code elements, and word space means responsive to concurrence of said additional code element and said specified code elements to render said shutter drive means nonresponsive to said specified code elements.

43. In photocomposing apparatus, the combination of a transilluminable font member characterized by a plurality of opaque mask spaces and a plurality of character spaces each bearing against an optically contrasting project an indicium in the form of an optically projectable character, said character spaces and mask spaces being relatively disposed in a checkered array having rows and columns each characterized by an alternation of character spaces with masking spaces, a plurality of row shutters respectively registering with said rows and adapted to be moved translationally between first and second positions in the direction of extent of said rows, each of said row shutters having formed therein a plurality of apertures which are disposed to be covered by the mask spaces of the corresponding row and to register with the character spaces thereof when, respectively, the row shutter is in the first and in the second of said two positions therefor, a plurality of column shutters respectively registering with said columns and adapted to be moved translationally between first and second positions in the direction of extent of said columns, each of said column shutters having formed therein a plurality of apertures which are disposed to be covered by the mask spaces of the corresponding column and to register with the character spaces thereof when, respectively, the column shutter is in the first and in the second of said two positions therefor, said row shutters and column shutters being all quiescently maintained in said first position therefor, a plurality of row shutter drive means adapted when actuated to respectively move said row shutters individually from said first to said second position therefor, a plurality of column shutter drive means adapted when actuated to respectively move said column shutters individually from said first to said second position therefor, and shutter drive selector means adapted to actuate a selected one out of any and all of said row shutter drive means and a selected one out of any and all of said column shutter drive means to move the one row and one column shutter corresponding thereto to thereby uncover a selected one out of any and all of said character spaces.

References Cited in the file of this patent

UNITED STATES PATENTS

| | | |
|---|---|---|
| 1,603,953 | Hunter | Oct. 19, 1926 |
| 1,732,049 | Hunter | Oct. 15, 1929 |
| 1,805,333 | Hunter | May 12, 1931 |
| 2,067,182 | Greene | Jan. 12, 1937 |
| 2,180,417 | Huebner | Nov. 21, 1939 |
| 2,229,689 | Westover | Jan. 28, 1941 |
| 2,351,126 | Highton | June 13, 1944 |
| 2,388,961 | Elliott | Nov. 13, 1945 |
| 2,392,224 | Bryce | Jan. 1, 1946 |
| 2,600,168 | Klyce | June 10, 1952 |
| 2,646,733 | Ackerman | July 28, 1953 |
| 2,653,526 | Peery | Sept. 29, 1953 |
| 2,663,232 | Drillick | Dec. 22, 1953 |
| 2,682,814 | Higonnet | July 6, 1954 |
| 2,699,101 | Ferguson | Jan. 11, 1955 |
| 2,701,991 | Croucher | Feb. 15, 1955 |
| 2,714,842 | Hooven | Aug. 9, 1955 |
| 2,714,843 | Hooven | Aug. 9, 1955 |
| 2,786,400 | Peery | Mar. 26, 1957 |

FOREIGN PATENTS

| | | |
|---|---|---|
| 182,887 | Great Britain | July 7, 1922 |
| 200,047 | Great Britain | June 25, 1923 |
| 200,532 | Great Britain | July 10, 1923 |
| 394,336 | Great Britain | June 21, 1933 |

UNITED STATES PATENT OFFICE
CERTIFICATE OF CORRECTION

Patent No. 3,122,075                                    February 25, 1964

Battle H. Klyce et al.

It is hereby certified that error appears in the above numbered patent requiring correction and that the said Letters Patent should read as corrected below.

Column 2, line 43, for "front", both occurrences, and column 3, lines 27 and 35, for "front, each occurrence, read -- font --; column 5, line 43, for "icircuit" read -- circuit --; column 9, line 64, for "rests" read -- resets --; column 10, line 37, after "resetting" insert -- of --; line 61, for "pulses" read -- pulse --; line 63, for "thee" read -- the --; column 13, line 55, and column 14, line 40, for "added", each occurrence, read -- adder --; lines 40 and 41, for "(FIG.2" read -- (FIG. 2) --; column 18, line 11, for "328" read -- 338 --; column 25, line 47, for "firm" read -- film --; line 62, for "front" read -- font --; column 26, line 43, for "element", first occurrence, read -- elements --; column 27, line 27, for "reecived" read -- received --; column 28, line 10, for "charatcerized" read -- characterized --; column 29, line 9, before "characters" strike out "a"; line 12, after "given pairs" insert a comma; column 30, line 6, for "cods" read -- code --; column 33, line 32, for "comprising" read -- composing --; line 64, for "operably" read -- operable --; column 34, line 11, for "designated" read -- designating --; column 36, line 20, after "thereto" insert a comma; line 56, strike out "the", first occurrence.

Signed and sealed this 21st day of July 1964

(SEAL)
Attest:

ESTON G. JOHNSON                                          EDWARD J. BRENNER
Attesting Officer                                       Commissioner of Patents